US008873093B2

(12) United States Patent
Kosuda

(10) Patent No.: US 8,873,093 B2
(45) Date of Patent: Oct. 28, 2014

(54) DELETING MAIL AT A SERVER AFTER IT IS CONFIRMED THE MAIL IS READ

(75) Inventor: Shota Kosuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 63 days.

(21) Appl. No.: 13/418,756

(22) Filed: Mar. 13, 2012

(65) Prior Publication Data

US 2012/0236349 A1 Sep. 20, 2012

(30) Foreign Application Priority Data

Mar. 17, 2011 (JP) ................................ 2011-058749

(51) Int. Cl.
*G06F 3/12* (2006.01)
*H04N 1/32* (2006.01)
*H04N 1/00* (2006.01)

(52) U.S. Cl.
CPC ........ *H04N 1/00212* (2013.01); *H04N 1/00217* (2013.01); *H04N 1/32021* (2013.01); *H04N 2201/0094* (2013.01); *H04N 1/32406* (2013.01)
USPC ........................................................ 358/1.15

(58) Field of Classification Search
CPC ..... H04L 12/5875; H04L 51/34; H04L 51/18; H04L 51/24; H04L 12/5885; H04L 51/30
USPC ......................................... 358/1.15; 709/209
See application file for complete search history.

(56) References Cited

U.S. PATENT DOCUMENTS

| | | | | |
|---|---|---|---|---|
| 6,332,164 | B1 * | 12/2001 | Jain | 709/235 |
| 2010/0235892 | A1 * | 9/2010 | Tomkow | 726/6 |
| 2012/0072510 | A1 * | 3/2012 | Li et al. | 709/206 |

FOREIGN PATENT DOCUMENTS

| | | | |
|---|---|---|---|
| JP | 10-240639 | A | 9/1998 |
| JP | 2000-003315 | * | 1/2000 |
| JP | 2000-003315 | A * | 1/2000 |
| JP | 2001-184278 | A | 7/2001 |
| JP | 2001-238064 | A | 8/2001 |
| JP | 2002-314745 | A | 10/2002 |
| JP | 2002-334042 | A | 11/2002 |
| JP | 2002-334043 | A | 11/2002 |
| JP | 2003-256339 | | 9/2003 |
| JP | 2004-178109 | A | 6/2004 |
| JP | 2008-080652 | A | 4/2008 |

OTHER PUBLICATIONS

MS Outlook 2003.*

* cited by examiner

*Primary Examiner* — Eric A Rust
(74) *Attorney, Agent, or Firm* — Kubotera & Associates, LLC

(57) ABSTRACT

An image processing apparatus includes a communication unit capable of transmitting and receiving a mail through a network; a data storage unit for storing the mail; a print unit for printing image data of the mail; a mail generation unit for generating a mail and an open mail notification instruction; a mail analysis unit capable of analyzing an open mail notification response; a processing control unit for deleting the mail when the mail analysis unit determines that an external device opens the mail including the open notification instruction. The processing control unit is also provided for notifying a user to open the mail stored when the mail analysis unit determines that the external device does not open the mail.

12 Claims, 21 Drawing Sheets

```
Date: Sun, 21 Mar 2010 21:35:24 +0900
From: mfp200@bbb.com
To: mfp100@aaa.com
Subject: InternetFAX Send
Disposition-Notification-To: mfp200@bbb.com
Message-ID: <20A79708.000000A8.00000001.13333331@bbb.com>
MIME-Version: 1.0
Content-Type: multipart/mixed; boundary="=_0547854090374712500020547842293_="

--=_0547854090374712500020547842293_=
Content-Type: text/plain; charset=utf-8

Attachment File Format: TIFF
        ⋮

--=_0547854090374712500020547842293_=
Content-Type: image/tiff, name=" 20100321xxxxxx.tif"
Content-Disposition: attachment; filename=" 20100321xxxxxx.tif"
Content-Transfer-Encoding: base64

TUOAKgAAxxxxxxxxxxxxxxxxxxxxxxxxxxxxxxxxxxxxxxxxxxxxxxxxxxxxxxxxx
xxxxxxxxxxxxxxxxxxxxxxxxx...

--=_0547854090374712500020547842293_=--
```

- From: → Transmission origination
- Disposition-Notification-To: → Transmission destination of MDN response
- Message-ID: → Identification mark
- base64 block → TIFF file

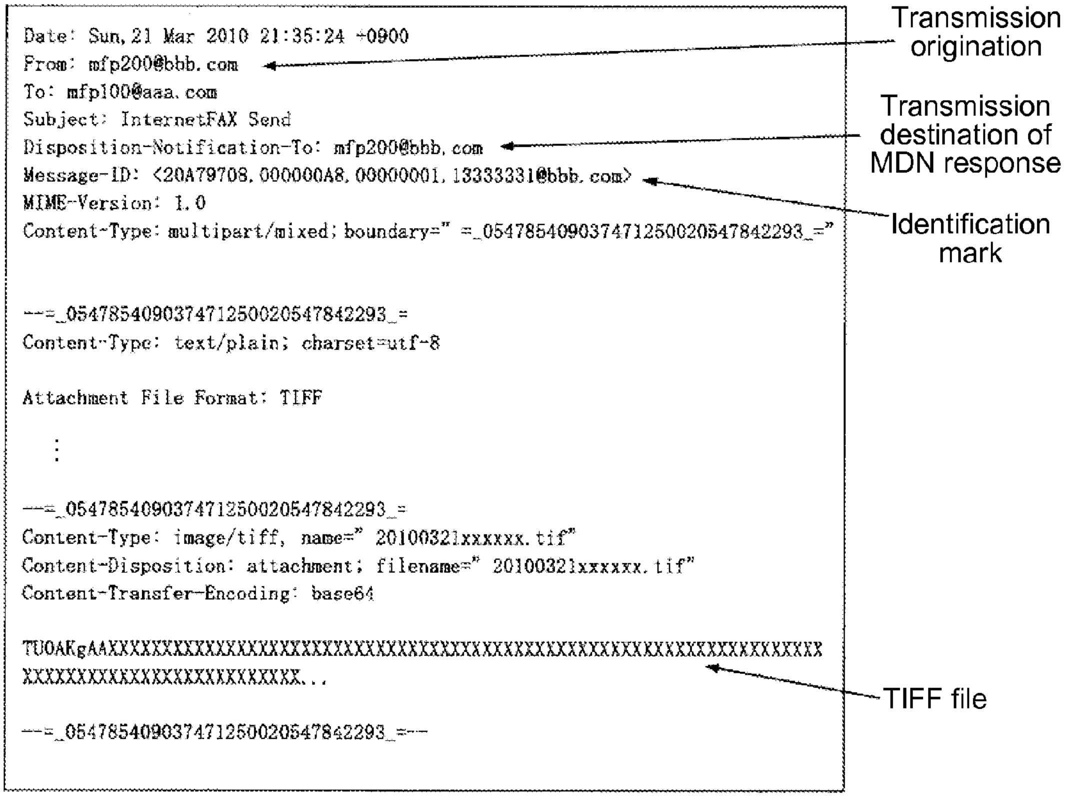

FIG. 4

```
Date: Sun, 21 Mar 2010 21:45:24 +0900
From: mfp100@aaa.com                                          ← Transmission
To: pc300@ccc.com                                                originazione
Subject: Email Forwarding
Disposition-Notification-To: mfp100@aaa.com   ←               Transmission
Message-ID: <20A79708.000000A8.00000001.14444441@aaa.com> ←  destination of
MIME-Version: 1.0                                             MDN response
Content-Type: multipart/mixed; boundary="_054785409037471250020547842293_="  ← Identification
                                                                                mark

--=_054785409037471250020547842293_=
Content-Type: text/plain; charset=utf-8

Attachment File Format: TIFF

    ⋮

--=_054785409037471250020547842293_=
Content-Type: image/tiff, name=" 20100321yyyyyy.tif"
Content-Disposition: attachment; filename=" 20100321yyyyyy.tif"
Content-Transfer-Encoding: base64

TUOAKgAAXXXXXXXXXXXXXXXXXXXXXXXXXXXXXXXXXXXXXXXXXXXXXXXXXXXXXX
XXXXXXXXXXXXXXXXXXXXXXXXX...                                   ← TIFF file

--=_054785409037471250020547842293_=--
```

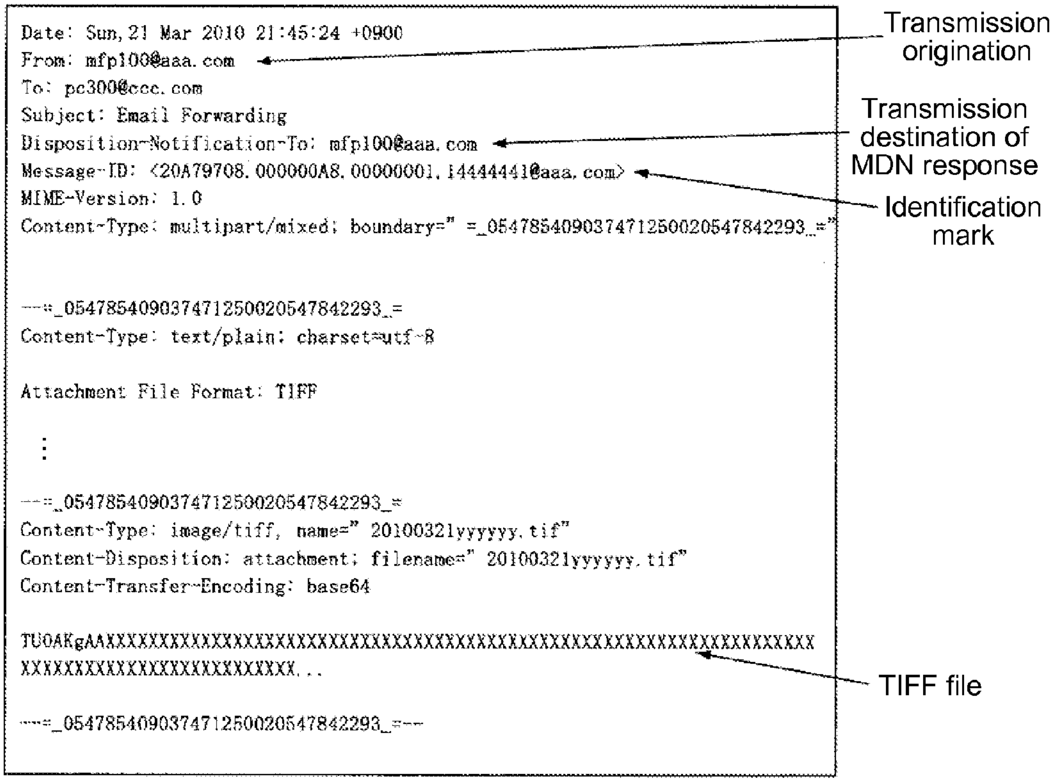

FIG. 5

| No. | Message-ID of MDN instruction | ID of TIFF file in MFP | Message-ID of transfer mail |
|---|---|---|---|
| 001 | 20A79708. 000000A8. 00000001. 11111111@bbb. com | 1 | 20A79708. 000000A8. 00000001. 12222221@aaa. com |
| 002 | 20A79708. 000000A8. 00000001. 13333331@bbb. com | 2 | 20A79708. 000000A8. 00000001. 14444441@aaa. com |
| : | : | : | : |

FIG. 6(a)

| Message-ID of MDN instruction | Disoisition-Notification-To of MDN instruction |
|---|---|
| 20A79708. 000000A8. 00000001. 11111111@bbb. com | mfp200@bbb. com |
| 20A79708. 000000A8. 00000001. 13333331@bbb. com | mfp200@bbb. com |
| : | : |

FIG. 6(b)

| Message-ID of transfer mail | Transfer process |
|---|---|
| 20A79708. 000000A8. 00000001. 12222221@aaa. com | Transferred |
| 20A79708. 000000A8. 00000001. 14444441@aaa. com | Transferring |
| : | : |

FIG. 6(c)

| No. | Message-ID of MDN instruction | Message-ID of transfer mail |
|---|---|---|
| 001 | 20A79708. 000000A8. 00000001. 11111111@bbb. com | 20A79708. 000000A8. 00000001. 12222221@aaa. com |
| 002 | 20A79708. 000000A8. 00000001. 13333331@bbb. com | 20A79708. 000000A8. 00000001. 14444441@aaa. com |
| : | : | : |

FIG. 17(a)

| Message-ID of MDN instruction | Disoisition-Notification-To of MDN instruction |
|---|---|
| 20A79708. 000000A8. 00000001. 11111111@bbb. com | mfp200@bbb. com |
| 20A79708. 000000A8. 00000001. 13333331@bbb. com | mfp200@bbb. com |
| : | : |

FIG. 17(b)

| Message-ID of transfer mail | Transfer process |
|---|---|
| 20A79708. 000000A8. 00000001. 12222221@aaa. com | Transferred |
| 20A79708. 000000A8. 00000001. 14444441@aaa. com | Transferring |
| : | : |

FIG. 17(c)

DELETING MAIL AT A SERVER AFTER IT IS CONFIRMED THE MAIL IS READ

BACKGROUND OF THE INVENTION AND RELATED ART STATEMENT

The present invention relates to an image processing apparatus, an image processing system, and a mail transfer apparatus. More specifically, the present invention relates to an image processing apparatus, an image processing system, and a mail transfer apparatus having a function of transmitting and receiving a mail with an image attached thereto.

A conventional image processing apparatus has an internet FAX function for performing an internet FAX transmission and an internet FAX reception. In the internet FAX transmission, a scanned image is attached to a mail, and the mail is transmitted through the internet. In the internet FAX reception, a file attached to a mail is printed when the mail with the file attached thereto is received through the internet (refer to Patent Reference). The conventional image processing apparatus also has a function of transferring the mail received through the internet FAX reception to a destination specified in advance.

Patent Reference: Japanese Patent Publication No. 2003-256339

In the conventional image processing apparatus disclosed in Patent Reference, when the mail is received through the internet FAX reception, and the mail is transferred, the image data thus received is deleted upon the successful transmission to a mail server. Accordingly, when the mail thus transferred is not properly received or not properly process at the transfer destination, it is difficult to confirm the image data thus received.

SUMMARY OF THE INVENTION

An object of the application is to disclose an image processing apparatus, an image processing system, and a mail transfer apparatus capable of confirming received image data even when a transferred mail is not received at a transfer destination or the transferred mail is not properly processed.

In order to attain the object described above, according to a first aspect of the application, an image processing apparatus is configured to process an image.

According to the first aspect of the application, the image processing apparatus includes a communication unit capable of transmitting and receiving a mail relative to a plurality of external devices including a first external device and a second external device through a network; and a data storage unit for storing the mail received with the communication unit and transmitted from the first external device.

According to the first aspect of the application, the image processing apparatus further includes a print unit for printing image data of the mail stored in the data storage unit; a mail generation unit for generating a mail including the image data of the mail stored in the data storage unit and transmitted from the first external device and an open mail notification instruction relative to the second external device, and for transferring the mail with the communication unit to the second external device; and a mail analysis unit capable of analyzing an open mail notification response from the second external device.

According to the first aspect of the application, the image processing apparatus further includes a processing control unit for deleting the mail stored in the data storage unit and transmitted from the first external device when the mail analysis unit determines that the second external device receives and opens the mail including the open notification instruction. The processing control unit is also provided for notifying a user to open the mail stored in the data storage unit and transmitted from the first external device when the mail analysis unit determines that the second external device does not open the mail including the open notification instruction. The processing control unit is also provided for controlling an entire operation of the image processing apparatus.

According to a second aspect of the application, an image processing system includes an image processing apparatus for processing an image; and a mail server device capable of transmitting and receiving a mail relative to a plurality of external devices including a first external device and a second external device through a network, and further capable of storing the mail thus received.

According to the second aspect of the application, the image processing apparatus includes a communication unit capable of transmitting and receiving a mail relative to the mail server device through the network; a print unit for printing image data of the mail received with the communication unit; a mail generation unit for generating a mail including the image data of the mail stored in the mail server device and received with the communication unit from the first external device and an open mail notification instruction relative to the second external device, and for transferring the mail with the communication unit to the second external device; and a mail analysis unit capable of analyzing an open mail notification response from the second external device.

According to the second aspect of the application, the image processing apparatus further includes a processing control unit for deleting the mail stored in the mail server device with the communication unit and transmitted from the first external device when the mail analysis unit determines that the second external device receives and opens the mail including the open notification instruction. The processing control unit is also provided for notifying a user to open the mail stored in the mail server device and transmitted from the first external device when the mail analysis unit determines that the second external device does not open the mail including the open notification instruction. The processing control unit is also provided for controlling an entire operation of the image processing system.

According to a third aspect of the application, a mail transfer apparatus includes a communication unit capable of communicating with a plurality of external devices including a first external device and a second external device through a network; a data storage unit for storing a first mail transmitted from the first external device; a mail generation unit for generating a transfer mail including the first mail and an open mail notification instruction relative to the second external device, and for controlling the communication unit to transfer the transfer mail to the second external device; a mail analysis unit capable of analyzing an open mail notification response from the second external device; and a processing control unit for outputting an analysis result of the mail analysis unit.

In the first aspect to the third aspect of the application, even when the image processing apparatus transfers the mail, and the mail is not properly received or processed at a transfer destination, it is possible to confirm the image data thus received.

BRIEF DESCRIPTION OF THE DRAWINGS

FIG. 4 is a schematic view showing a mail format representing transmission contents of a mail transmitted from the MFP through an internet FAX transmission according to the first embodiment of the present invention;

FIG. 5 is a schematic view showing a mail format representing transmission contents of a transfer mail generated with the MFP according to the first embodiment of the present invention;

FIGS. 6(*a*) to 6(*c*) are schematic views showing transfer mail information according to the first embodiment of the present invention;

FIGS. 17(*a*) to 17(*c*) are schematic views showing transfer mail information according to the second embodiment of the present invention;

DETAILED DESCRIPTION OF PREFERRED EMBODIMENTS

Hereunder, embodiments of the present invention will be explained with reference to the accompanying drawings. It is noted that the drawings are presented for an explanation purpose only, and the present invention is not limited to the embodiments.

First Embodiment

Figure 1:
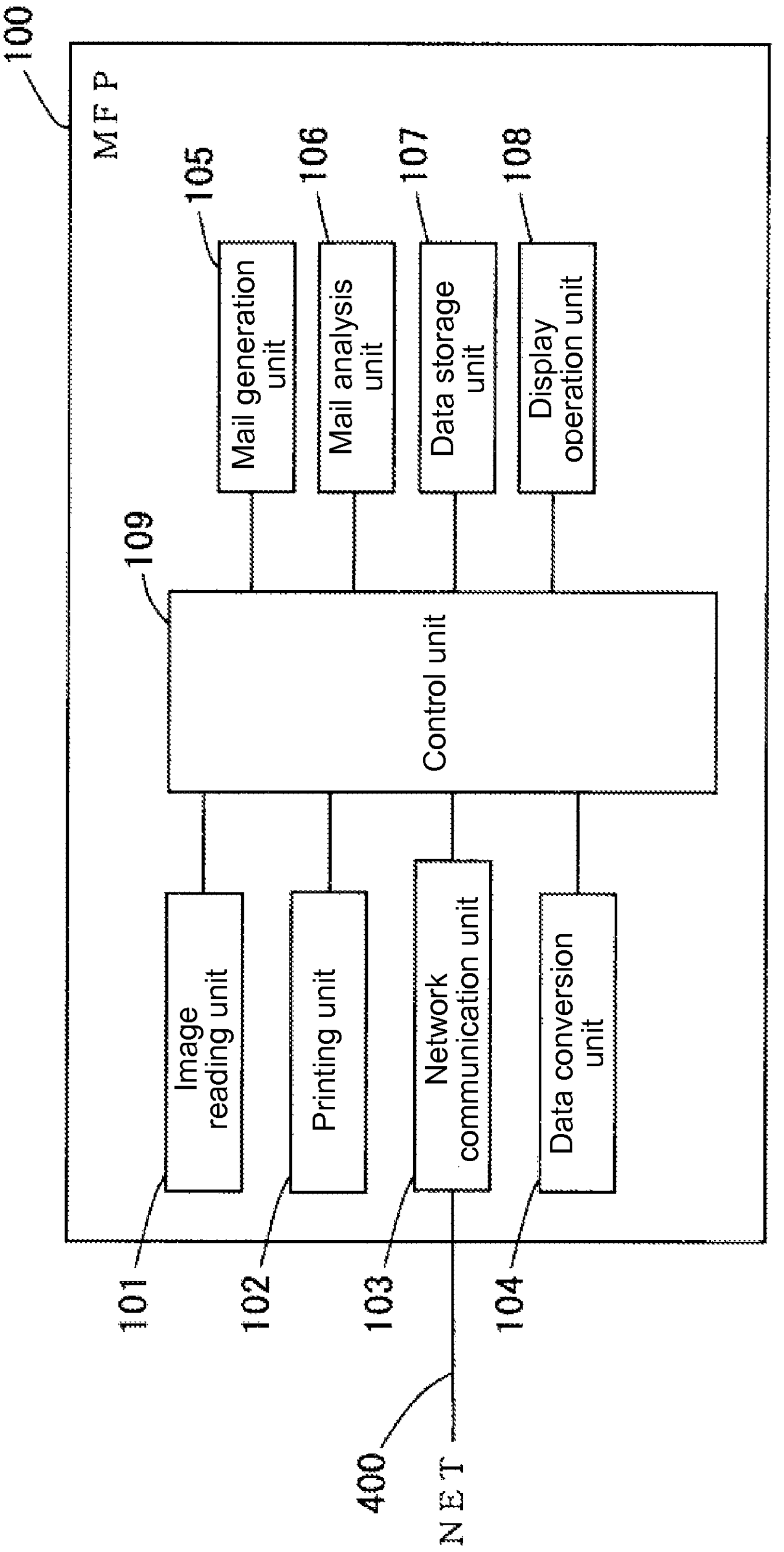
FIG. 1 is a block diagram showing a configuration of an MFP (Multi Function Peripheral) as an image processing apparatus according to a first embodiment of the present invention.

A first embodiment of the present invention will be explained. FIG. 1 is a block diagram showing a configuration of an MFP (Multi Function Peripheral) 100 as an image processing apparatus according to the first embodiment of the present invention.

As shown in FIG. 1, the MFP 100 includes an image reading unit 101; a printing unit 102; a network communication unit 103; a data conversion unit 104; a mail generation unit 105; a mail analysis unit 106; a data storage unit 107; a display operation unit 108; and a control unit 109.

In the embodiment, the image reading unit 101 is configured to read an original set on the MFP 100, and may be formed of a scanner disposed at an upper portion of the MFP 100. The printing unit 102 is configured to analyze and print the print data described in a page description language. The print data may include data of a Post Script format (Post Script is a trademark of Adobe Systems Incorporated).

In the embodiment, the network communication unit 103 is configured as a communication unit to transmit and receive data using various protocols. For example, when the network communication unit 103 transmits a mail, the network communication unit 103 performs a process as a client of SMTP (Simple Mail Transfer Protocol). When the network communication unit 103 receives a mail, the network communication unit 103 performs a process as a client of POP3 (Post Office Protocol Version 3). The data conversion unit 104 is configured to perform a conversion process of a file format. For example, the data conversion unit 104 converts data of a TIFF (Tagged Image File Format) format to data of the Post Script format, or conversely converts the data of the Post Script format to the data of the TIFF format.

In the embodiment, the mail generation unit 105 is configured to generate data capable of being transmitted as a mail. For example, when the MFP 100 transmits a file through a mail, the mail generation unit 105 generates the data of a mail format, in which the file to be transmitted is attached to the mail as an attachment file. Further, the mail generation unit 105 may attach an MDN (Message Disposition Notification) instruction in the mail format as an open mail notification.

When an internet FAX communication is performed, a reception side device may be provided with an MDN function. Accordingly, when a transmission side device transmits a mail with the MDN instruction attached thereto through an internet FAX transmission, and the reception side device receives the mail with or without opening the mail through an internet FAX reception, the reception side device transmits an MDN response mail indicating that the reception side device opens or does not open the mail.

In the embodiment, the MFP 100 is provided with the MDN function. Accordingly, when the transmission side device transmits the mail with the MDN instruction attached thereto, the transmission side device is capable of receiving the MDN response from the reception side device. Accordingly, it is possible to confirm that the reception side device receives and opens the mail, or does not receive and delete the mail, and the like.

In the embodiment, the mail analysis unit 106 is configured to perform an analysis process of the mail. For example, when the MFP 100 receives a file attached to a received mail, or the MDN response is attached to the received mail, the mail analysis unit 106 confirms that it is required to transmit the MDN response. When the received mail is the MDN response mail, the mail analysis unit 106 analyzes contents of the received mail. The data storage unit 107 is configured to perform an administrative process such as storing, updating, deleting, and the like. For example, the data storage unit 107 stores, updates, and deletes data such as setting values of the MFP 100. Further, the data storage unit 107 stores, updates, and deletes the received mail or the image data attached to the received mail.

In the embodiment, the display operation unit 108 is configured to display a status of the MFP 100 and menu information, so that the user is able to confirm the status of the MFP 100. Further, the display operation unit 108 is configured to receive an operation instruction such as updating the setting values of the MFP 100, executing a function of the MFP 100, and the like. The control unit 109 is configured to control each unit of the MFP 100. Further, the control unit 109 is configured to control a clock disposed in the MFP 100 to detect an elapsed time. It is noted that the display operation unit 108 and the control unit 109 correspond to a process control unit, and the display operation unit 108 also corresponds to an instruction obtaining unit.

With the configuration described above, when the user operates the display operation unit 108 to input an instruction for performing the internet FAX transmission, the image reading unit 101 reads the original set on the MFP 100 to generate the image data. Then, the data conversion unit 104 converts the data generated with the image reading unit 101 to the file of the TIFF format. After the mail generation unit 105 generates the file converted with the data conversion unit 104 in the mail format, the network communication unit 103 transmits the mail of the data in the mail format. Through the process described above, it is possible to perform the internet FAX transmission.

Further, for example, the network communication unit 103 receives the mail with the file of the TIFF format attached thereto from a mail server. Then, the mail analysis unit 106 analyzes the mail, and the data storage unit 107 stores the file attached to the mail. After the data conversion unit 104 converts the file attached to the mail to the print data, the printing unit 102 performs the process on the print data, so that the print data is printed. Through the process described above, it is possible to perform the internet FAX reception.

Figure 2:
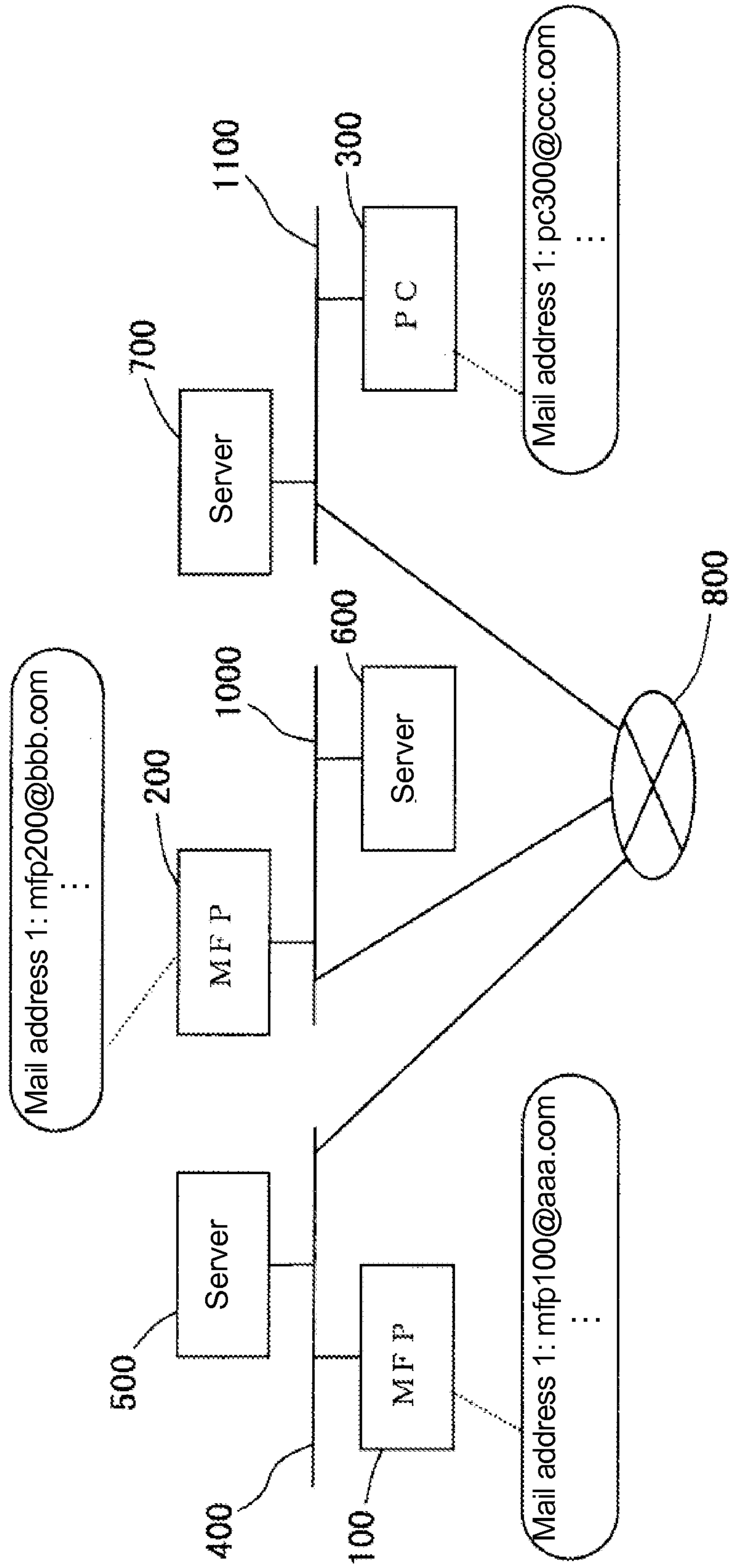
FIG. 2 is a schematic view showing a network including the MFPs according to the first embodiment of the present invention.

FIG. 2 is a schematic view showing a network including the MFP 100 according to the first embodiment of the present invention. As shown in FIG. 2, in the network, the MFP 100, an MFP 200, a PC (Personal Computer) 300, a server 500, a server 600, and a server 700 are connected to an internet 800 through a network 400, a network 1000, and a network 1100. Accordingly, it is possible to perform communication through TCP/IP.

In the embodiment, the MFP 200 corresponds to a first external device, and has a configuration similar to that of the MFP 100 except setting information such as a mail address thereof. The MFP 300 corresponds to a second external device, and is provided with functions of the SMPT client and the POP client, so that the PC 300 is capable of transmitting and receiving the mail. Further, the PC 300 is provided with the MDN function such as the reception of the MDN instruction and the transmission of the MDN response.

In the embodiment, the server 500, the server 600, and the server 700 have the functions of the SMTP server and the POP server except the setting information such as an IP address and the like. More specifically, the server 500, the server 600, and the server 700 are configured to receive the mail transmission instruction from the SMTP client, and to receive the mail reception instruction from the POP client, so that the server 500, the server 600, and the server 700 perform the process as the mail server. If necessary, the server 500, the server 600, and the server 700 perform a relay process of the mail received from the SMTP client.

In the embodiment, the MFP 100, the MFP 200, the PC 300, the server 500, the server 600, and the server 700 are connected to the internet 800, thereby making it possible to perform communication through TCP/IP. Alternatively, other network configuration may be used.

An operation of the MFP 100 in the network shown in FIG. 2 will be explained next. In the operation, the MFP 100 receives the mail with the MDN instruction from the MFP 200 through the internet FAX reception. Then, the MFP 100 newly attaches the MDN instruction to the mail thus received, and transfers the mail to the PC 300.

More specifically, as an actual example, before the user of the MFP 100 travels to a business trip destination, the user sets the MFP 100 such that the mail received from the MFP 200 through the internet FAX reception is to be transferred to the PC 300 located at the business trip destination. After the user of the MFP 100 travels to the business trip destination, the user receives the mail with the PC 300 at the business trip destination, and the MDN response is transmitted from the PC 300. The following description will explain the flow of the operation described above.

Figure 3:
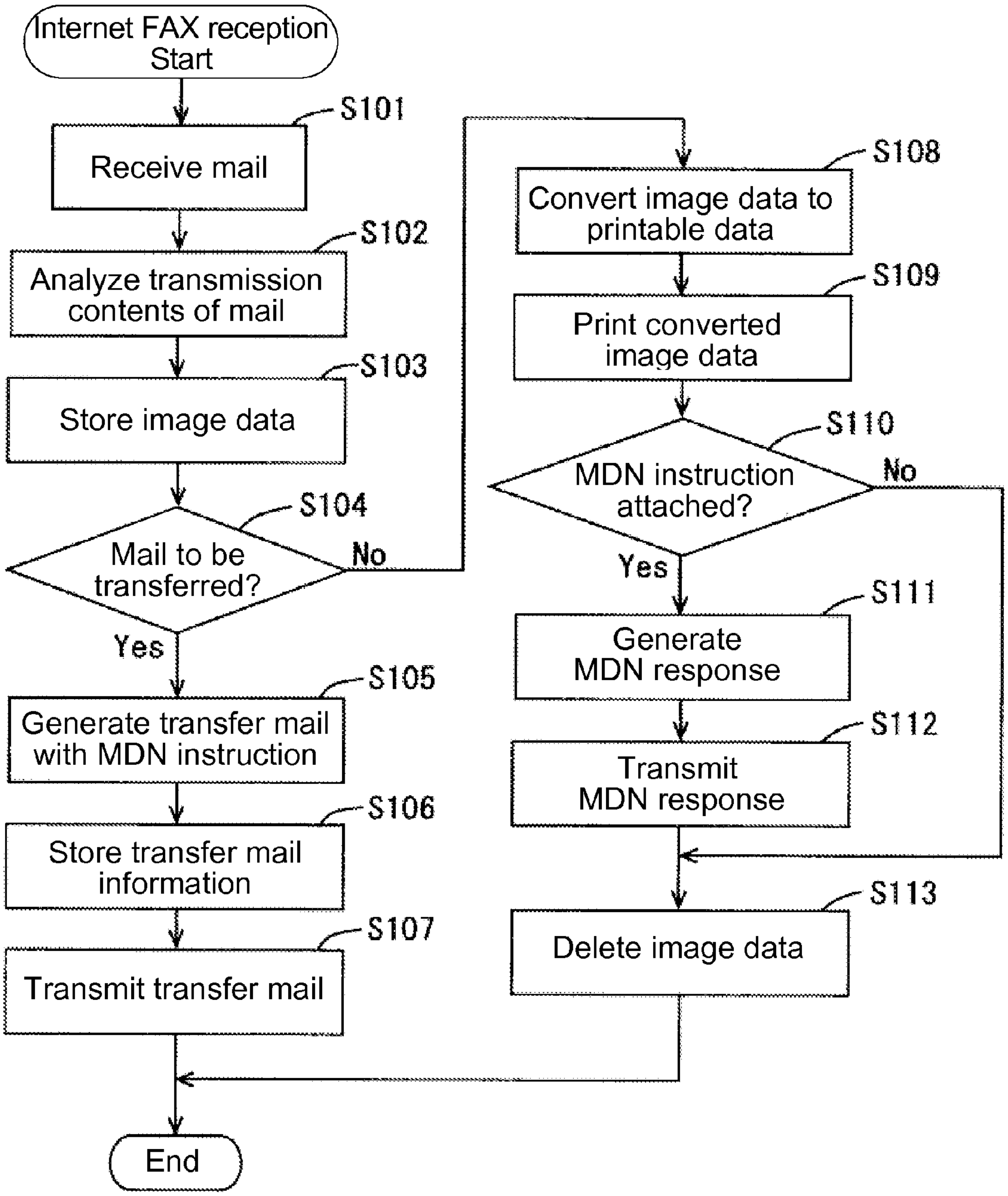
FIG. 3 is a flow chart showing a mail transfer operation of the MFP when the MFP performs an internet FAX reception according to the first embodiment of the present invention.
Figure 12:
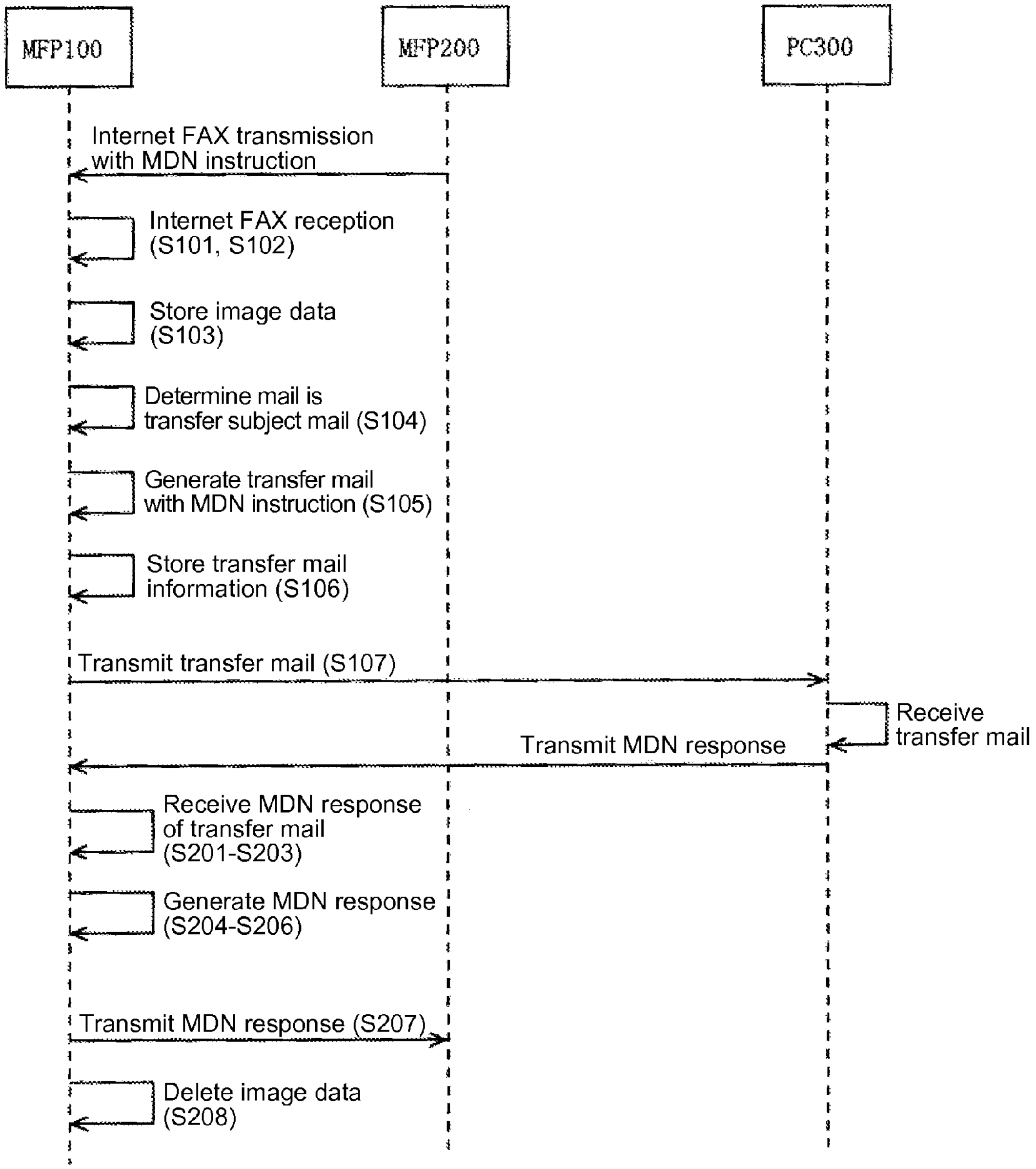
FIG. 12 is a communication chart showing a flow of messages between the devices when the MFP performs the mail transfer operation according to the first embodiment of the present invention.

FIG. 3 is a flow chart showing a mail transfer operation of the MFP 100 when the MFP 100 performs the internet FAX reception according to the first embodiment of the present invention. FIG. 12 is a communication chart showing a flow of messages between the devices when the MFP 100 performs the mail transfer operation according to the first embodiment of the present invention. In the following description, the mail transfer operation of the MFP 100 will be explained with reference to FIGS. 1, 2 and 12 along the flow chart shown in FIG. 3.

In the mail transfer operation of the MFP 100, first, the user operates the display operation unit 108 of the MFP 100 (refer to FIG. 1) to set the MFP 100 such that the mail address "pc300@ccc.com" of the PC 300 located at the business trip destination is to be the transmission destination when the MFP 100 receives the mail having the mail address "mfp200@bbb.com" of the MFP 200 as the transmission origination address through the internet FAX reception. It is noted that the data storage unit 107 stores the setting data.

After the user travels to the business trip destination, when the MFP 200 transmits the mail through the internet FAX transmission with the mail address "mfp100@aaa.com" of the MFP 100 as the transmission destination address, the mail is stored in a mail box of the server 500 corresponding to the mail address "mfp100@aaa.com" through the network 400 via the server 600 and several mail servers on the internet 800.

In step S101, the network communication unit 103 of the MFP 100 (refer to FIG. 1) communicates with the server 500 (refer to FIG. 2) using POP3 through the network 400.

Accordingly, the network communication unit 103 of the MFP 100 (refer to FIG. 1) receives the mail stored in the mail box of "mfp100@aaa.com" and transmitted to the MFP 100 from the MFP 200.

In the mail transfer operation of the MFP 100, it is noted that when the MFP 100 receives the mail stored in the mail box of "mfp100@aaa.com" of the server 500, the mail is deleted from the mail box. Further, the mail is deleted from the mail box at an arbitrary timing, for example, at a timing when the MFP 100 receives the mail, or at a timing when the image data of the TIFF format is stored inside the device.

In step S102, after the MFP 100 receives the mail, the mail analysis unit 106 (refer to FIG. 1) receives the mail thus received from the network communication unit 103 and analyzes the transmission contents of the mail. More specifically, the mail analysis unit 106 analyzes whether the TIFF file is attached to the mail; whether the MDN instruction is attached to the mail from a field "Disposition-Notification-To" (refer to FIG. 4); and whether the mail is a transfer subject mail to be transferred to the transfer destination "mfp200@bbb.com" from a field "From" (refer to FIG. 4).

FIG. 4 is a schematic view showing the mail format representing the transmission contents of the mail transmitted from the MFP 200 through the internet FAX transmission according to the first embodiment of the present invention.

As shown in FIG. 4, when the MDN instruction is attached to the mail, the transmission destination of the MDN response is assigned in the field "Disposition-Notification-To", and an identification mark is attached to a field "Message-ID".

In step S103, after the mail analysis unit 106 analyzes the transmission contents of the mail, the data storage unit 107 (refer to FIG. 1) stores the image data of the TIFF file thus received in the device according to the analysis result of the mail analysis unit 106. In step S104, the control unit 109 (refer to FIG. 1) determines whether the mail thus received is the transfer subject mail to be transferred to the transfer destination.

When the control unit 109 determines that the mail thus received is the transfer subject mail from the analysis result of the mail analysis unit 106 (Yes in step S104), the control unit 109 obtains the mail address "pc300@ccc.com" of the PC 300 from the data storage unit 107 (refer to FIG. 1), and specifies the mail address as the transmission destination. Then, the control unit 109 requests the mail generation unit 105 to transfer the TIFF file thus received through the transfer mail transmission.

In step S105, the mail generation unit 105 obtains the TIFF file from the data storage unit 107 according to the specified information, and generates the transfer mail having the transmission destination "pc300@ccc.com". It is noted that the MDN instruction and the TIFF file are also attached to the transfer mail. Afterward, the mail generation unit 105 transmits the data thus generated to the network communication unit 103.

FIG. 5 is a schematic view showing the mail format representing the transmission contents of the transfer mail generated with the MFP 100 according to the first embodiment of the present invention.

As shown in FIG. 5, the transmission origination of the transfer mail "mfp100@aaa.com" is assigned in the field "From", and the transmission destination of the transfer mail "pc300@aaa.com" is assigned in the field "To". Further, since the MDN instruction is attached to the transfer mail, the transmission destination of the MDN response "mfp100@aaa.com" is assigned in the field "Disposition-Notification-To".

In step S106, the transfer mail information is stored in the data storage unit 107. In the transfer mail information, the mail thus received with the MDN instruction attached thereto, the image data of the TIFF file thus received, and various information of the transfer mail are correlated as shown in FIGS. 6(*a*) to 6(*c*). FIGS. 6(*a*) to 6(*c*) are schematic views showing the transfer mail information according to the first embodiment of the present invention. When the MDN response of the transfer mail is returned, the transfer mail information shown in FIGS. 6(*a*) to 6(*c*) is used (described later).

In step S107, the network communication unit 103 communicates with the server 500 as the mail server using SMTP through the network 400, so that the network communication unit 103 transmits the transfer mail to the mail address of the PC 300.

In step S108, when the control unit 109 determines that the mail thus received is not the transfer subject mail from the analysis result of the mail analysis unit 106 (No in step S104), the data conversion unit 104 converts the image data thus received to the printable data. In step S109, the printing unit 102 prints the image data thus converted.

In step S110, the control unit 109 determines whether the MDN instruction is attached to the mail thus received. In step S111, when the control unit 109 determines that the MDN instruction is attached to the mail thus received (Yes in step S110), the mail generation unit 105 generates the mail of the MDN response relative to the mail. In step S112, the MDN response is transmitted to the instruction origination. In step S113, the image data of the mail stored in the data storage unit 107 is deleted, thereby completing the process. When the control unit 109 determines that the MDN instruction is not attached to the mail thus received (No in step S110), the image data of the mail stored in the data storage unit 107 is deleted after printing the image data, thereby completing the process.

In the embodiment, after the MFP 100 transmits the transfer mail, the server 500 (refer to FIG. 2) transfers the transfer mail transmitted from the MFP 100 to the server 700 through several mail servers on the internet 800. Then, the server 700 stores the transfer mail transmitted from the MFP 100 in the mail box corresponding to "pc300@ccc.com".

Afterward, the PC 300 (refer to FIG. 2) receives the transfer mail transmitted from the MFP 100 from the server 700. At this moment, the MDN instruction is attached to the transfer mail. Accordingly, the PC 300 transmits the MDN response to the MFP 100. The mail server processes the MDN response transmitted from the PC 300 to the MFP 100, and eventually the server 500 stores the MDN response to the mail box corresponding to "mfp100@aaa.com".

Figure 7:
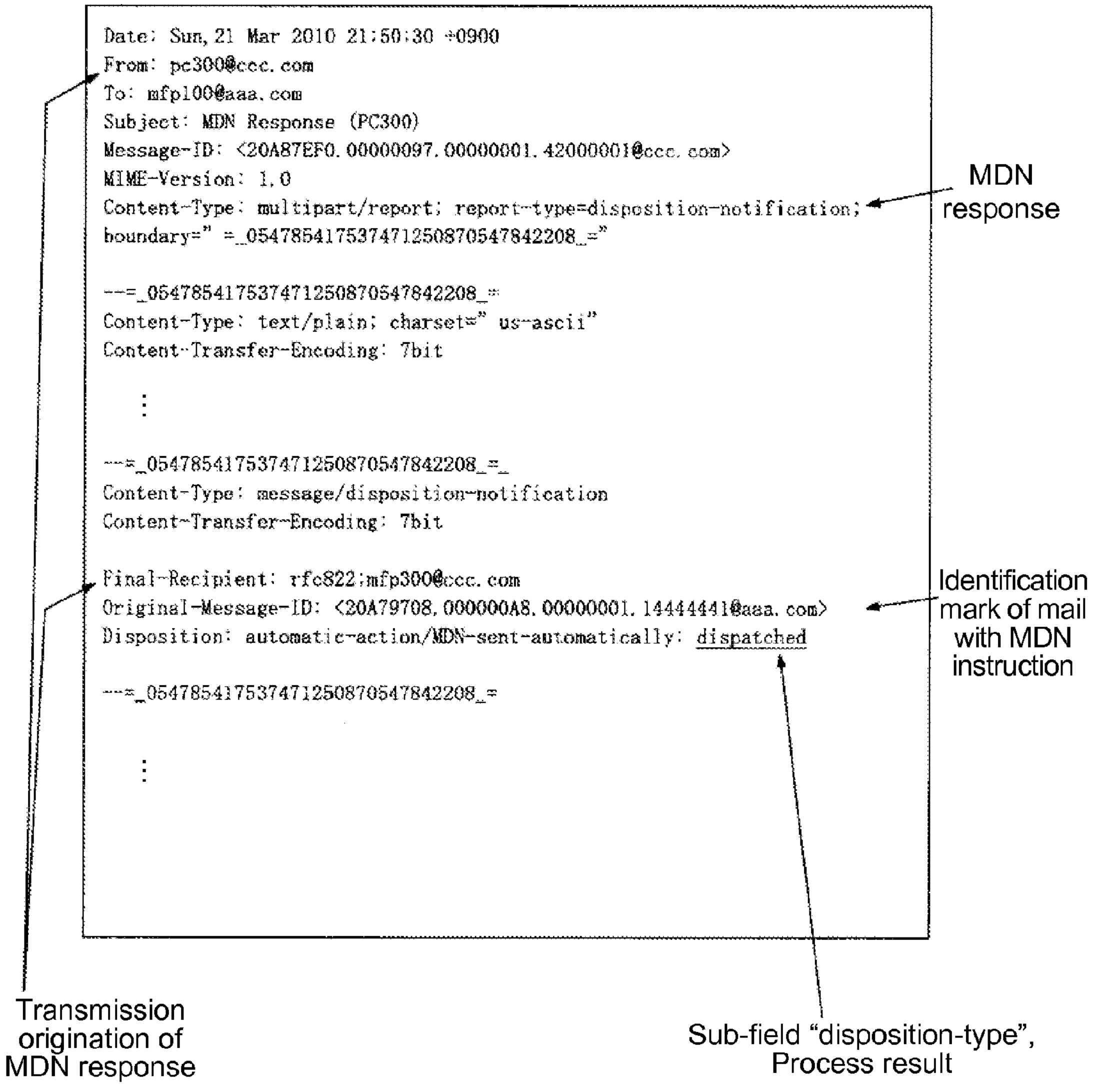
FIG. 7 is a schematic view showing a mail format of an MDN (Message Disposition Notification) response transmitted from a PC (Personal Computer) to the MFP according to the first embodiment of the present invention.

FIG. 7 is a schematic view showing the mail format of the MDN (Message Disposition Notification) response transmitted from the PC 300 to the MFP 100 according to the first embodiment of the present invention.

As shown in FIG. 7, when "dispatched" is specified in the sub-field "disposition-type", it is indicated that the PC 300 opens and properly processes the transfer mail. When "processed/error" is specified in the sub-field "disposition-type", it is indicated that the PC 300 does not properly process the transfer mail, i.e., the PC 300 does not open and deletes the transfer mail.

Figure 8:
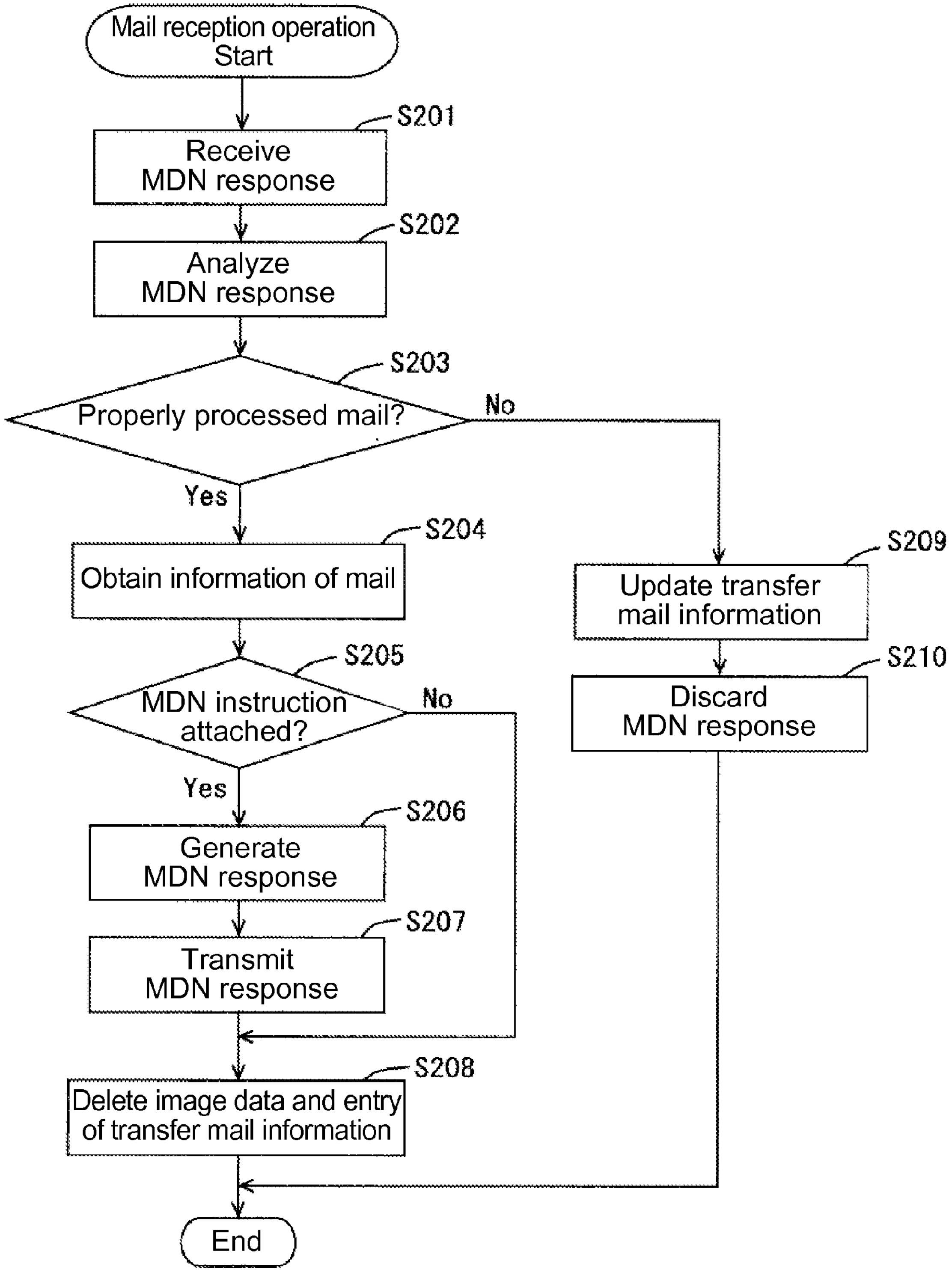
FIG. 8 is a flow chart showing a mail reception operation of the MFP when the MFP receives the MDN response transmitted with the PC from a server according to the first embodiment of the present invention.

A mail reception operation of the MFP 100 will be explained next with reference to FIGS. 1, 2, and 12 along a flow chart shown in FIG. 8. FIG. 8 is the flow chart showing the mail reception operation of the MFP 100 when the MFP 100 receives the MDN response transmitted with the PC 300 from the server 500 according to the first embodiment of the present invention.

In step S201, the network communication unit 103 of the MFP 100 communicates with the server 500 through the network 400 using POP3, so that the network communication unit 103 of the MFP 100 receives the MDN response transmitted from the PC 300 to the MFP 100 and stored in the mail box "mfp100@aaa.com". In step S202, the mail analysis unit 106 receives the mail thus received from the network communication unit 103, and performs the mail analysis through the data storage unit 107 referring to the transfer mail information represented in FIG. 6(*a*).

As a result, the mail analysis unit 106 determines that the mail thus received is the MDN response of the mail transferred to the PC 300 judging from the field "Original-Message-ID" shown in FIG. 7. More specifically, as described above, the mail thus received is the MDN response. Accordingly, the identification mark of the MDN response is shown in the field "Original-Message-ID". As a result, the recipient of the MDN response can determine that the MDN response is associated with the MDN instruction.

In step S203, the mail analysis unit 106 determines whether the PC 300 properly processes the mail referring to the sub-field "disposition-type" (refer to FIG. 7) indicating the process result and attached to the MDN response. When "dispatched" is specified in the sub-field "disposition-type", the mail analysis unit 106 determines that the PC 300 properly processes the mail (Yes in step S203).

In step S204, when the mail analysis unit 106 determines that the PC 300 properly processes the mail (Yes in step S203), the mail analysis unit 106 obtains the information of the mail thus received from the transfer mail information shown in FIG. 6. More specifically, the mail analysis unit 106 obtains the value "mfp200@bbb.com" in the field "Disposition-Notification-To" and the value "20A79708.000000A800000001.13333331@bbb.com" in the field "Message-ID" of the mail with the MDN instruction attached thereto and received from the MFP 200.

In step S205, the mail analysis unit 106 determines whether the MDN instruction is attached to the mail received from the MFP 200. When the mail analysis unit 106 determines that the MDN instruction is attached to the mail (Yes in step S205), the mail analysis unit 106 notifies the mail generation unit 105 that the PC 300 properly processes the mail, the value in the field "Disposition-Notification-To", and the value in the field "Message-ID", so that the transmission request of the MDN response to the MFP 200 is transmitted to the mail generation unit 105.

In step S206, when the mail generation unit 105 receives the transmission request, the mail generation unit 105 generates the MDN response with respect to the mail thus received. More specifically, based on the notification information from the mail analysis unit 106, the mail generation unit 105 generates the data of the mail format of the MDN response shown in FIG. 9, in which the transmission designation is set to "mfp200@bbb.com", and "dispatched" is specified in the sub-filed "disposition-type" indicating that the mail is properly processed as the process result of the MFP 100 from the process result of the mail thus transferred.

Figure 9:
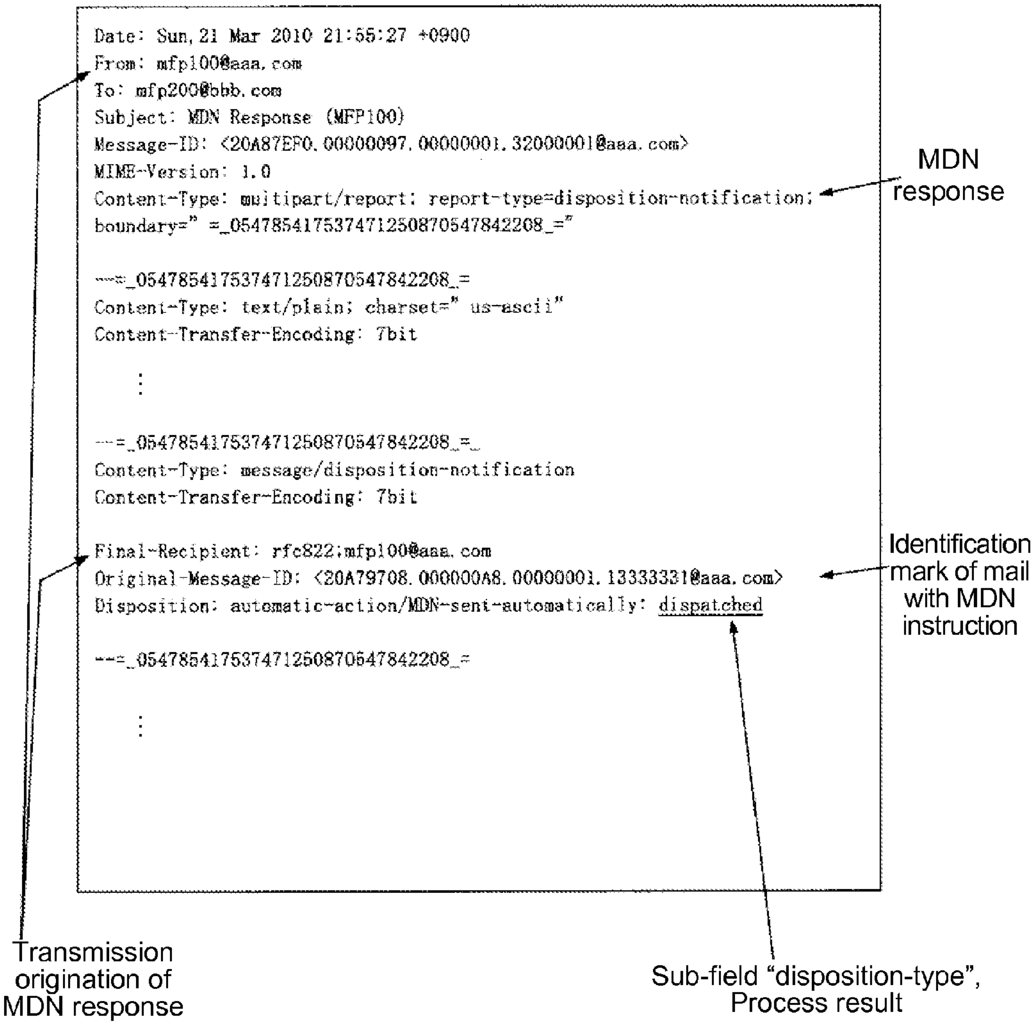
FIG. 9 is a schematic view showing a mail format of the MDN response indicating a process result of the transfer mail and transmitted from the MFP to the MFP according to the first embodiment of the present invention.

FIG. 9 is a schematic view showing the mail format of the MDN response indicating the process result of the transfer mail and transmitted from the MFP 100 to the MFP 200 according to the first embodiment of the present invention.

In step S207, the network communication unit 103 communicates with the server 500 through the network 400 using SMTP, so that the network communication unit 103 transmits the mail of the MDN response generated with the mail generation unit 105 to the mail address of the MFP 200.

In the embodiment, after the MFP 100 transmits the mail to the MFP 200, the server 500 transmits the mail transmitted from the MFP 100 to the server 600 through several mail servers on the internet 800. Then, the server 600 stores the mail thus received and transmitted from the MFP 100 in the mail box corresponding to "mfp200@bbb.com". Afterward, the MFP 200 receives the MDN response from the MFP 100, so that it is possible to confirm that the MFP 100 properly processes the mail.

In step S208, after the network communication unit 103 transmits the mail, the control unit 109 of the MFP 100 deletes the image data thus received and the entry of the transfer mail information. It is noted that the image data corresponds to the TIFF file stored in the device and received from the MFP 200 as described above. Afterward, the process is complete.

When the mail analysis unit 106 determines that the MDN instruction is not attached to the mail (No in step S205), step S208 is performed to delete the image data and the entry without generating and transmitting the mail of the MDN response, thereby completing the process.

When the error such as "processed/error", not "dispatched", is specified in the sub-field "disposition-type" shown in FIG. 7, the mail analysis unit 106 determines that the PC 300 does not properly process the mail (No in step S203). In this case, in step S209, the mail analysis unit 106 updates the transfer mail information thus stored. In step S210, the mail analysis unit 106 discards the MDN response thus received, thereby completing the process.

In the embodiment, when the MFP 100 receives the mail with the MDN instruction attached thereto from the MFP 200, the MFP 100 transmits the mail of the MDN response as the response to the MFP 200. Alternatively, for example, after the transfer mail to the PC 300 is transmitted to the server 500, a progress status may be transmitted to the MFP 200 through a normal response mail indicating the transfer, and a final result may be transmitted as the MDN response.

As described above, in the embodiment, the MFP 100 transfers the transfer mail to the PC 300, and the PC 300 transmits the MDN response to the MFP 100. Next, an operation in a case that the PC 300 does not transmit the MDN response will be explained. In a case that, for example, the user returns from the business trip destination, after the user deletes the mail box of the server 700 corresponding to "pc300@ccc.com" at the business trip destination, the MFP 100 receives the mail from the MFP 200 and transfers the mail to the PC 300 while the user is returning from the business trip destination.

As describe above, while the user is returning from the business trip destination, the user specifies the mail address of the MFP 100 "mfp100@aaa.com" as the transmission destination, and transmits the mail from the MFP 200 through the internet FAX transmission. Accordingly, the mail is transmitted through the network 400 via the server 600 and several mail servers on the internet 800, and is stored in the mail box of the server 500 corresponding to "mfp100@aaa.com".

It is noted that the operation of the MFP 100 for receiving the mail from the MFP 200 and transmitting the transfer mail to the PC 300 is similar to the transfer operation explained with reference to the flow chart shown in FIG. 3, and an explanation thereof is omitted. Only an operation of the MFP 100 after the MFP 100 transmits the transfer mail to the server 500 with the PC 300 as the transmission destination will be explained.

After the MFP 100 transmits the transfer mail to the server 500, the server 500 transfers the transfer mail to the server 700 through several mail servers on the internet 800. In this case, the mail box of the server 700 corresponding to "pc300@ccc.com" is already deleted. Accordingly, the transfer mail from the MFP 100 fails to be transferred to the server 700, and the mail server discards the transfer mail transmitted from the MFP 100. Accordingly, the PC 300 does not transmit the MDN response to the MFP 100.

As described above, when the mail box of the server 700 corresponding to "pc300@ccc.com" is deleted, the PC 300 does not transmit the MDN response to the MFP 100. Further, it is noted that even though the mail box of the server 700 corresponding to "pc300@ccc.com" is not deleted, and the transfer mail transmitted to the PC 300 is properly stored, when the user deletes the reception setting set in the PC 300 for receiving the mail from the mail box "pc300@ccc.com", or the user cannot manually receive the mail in the PC 300 since the user is returning from the business trip destination, the PC 300 does not transmit the MDN response to the MFP 100.

A printing operation of the MFP 100 will be explained next with reference to FIGS. 1, 2, 11 and 13 along a flow chart shown in FIG. 10. In the printing operation, after returning from the business trip destination, the user operates the MFP 100 to print the image data of the TIFF file stored in the MFP 100 without being deleted and transmitted from the MFP 200.

Figure 10:
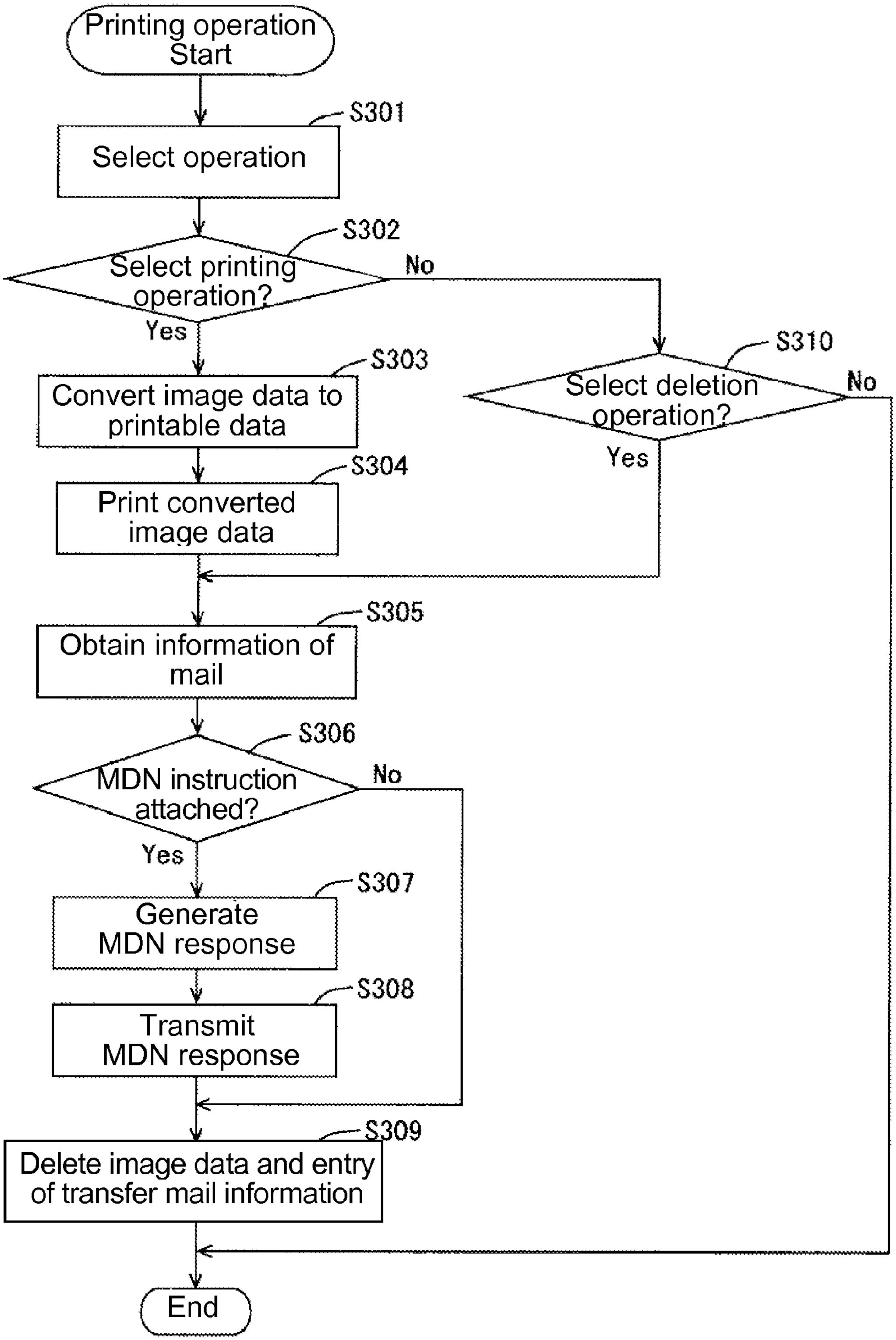
FIG. 10 is a flow chart showing a printing operation for printing image data of a TIFF (Tagged Image File Format) file stored in the MFP according to the first embodiment of the present invention.
Figure 11:
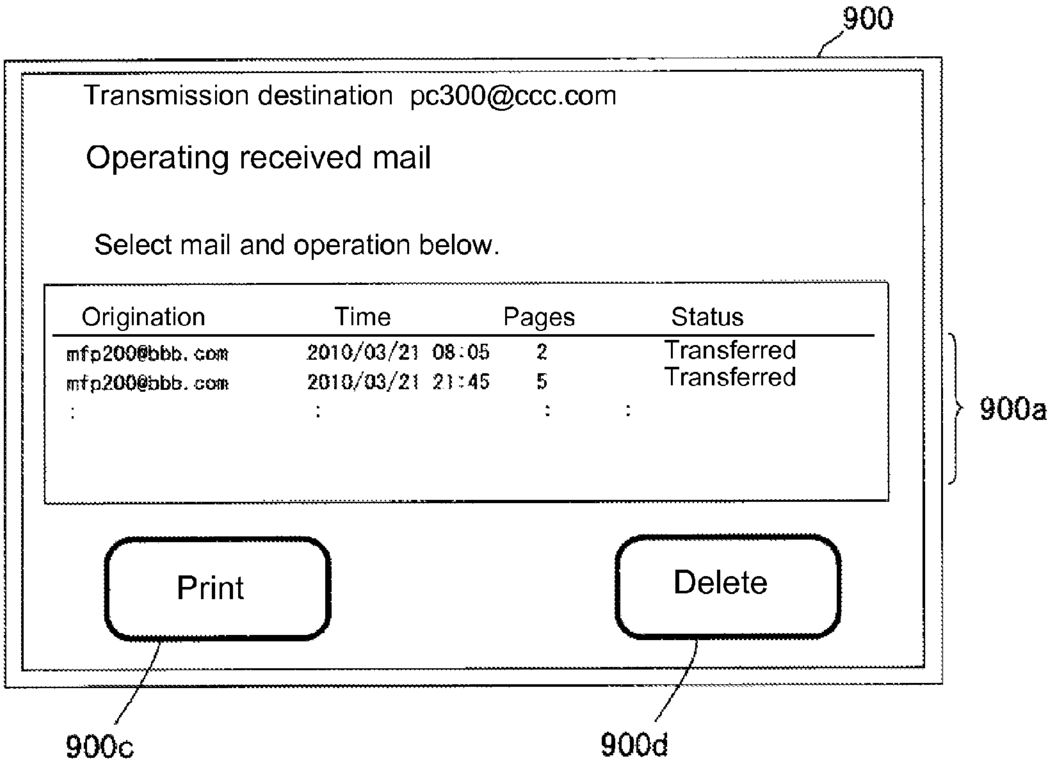
FIG. 11 is a schematic view showing an example of a display screen displayed to a user during the printing operation according to the first embodiment of the present invention.
Figure 13:
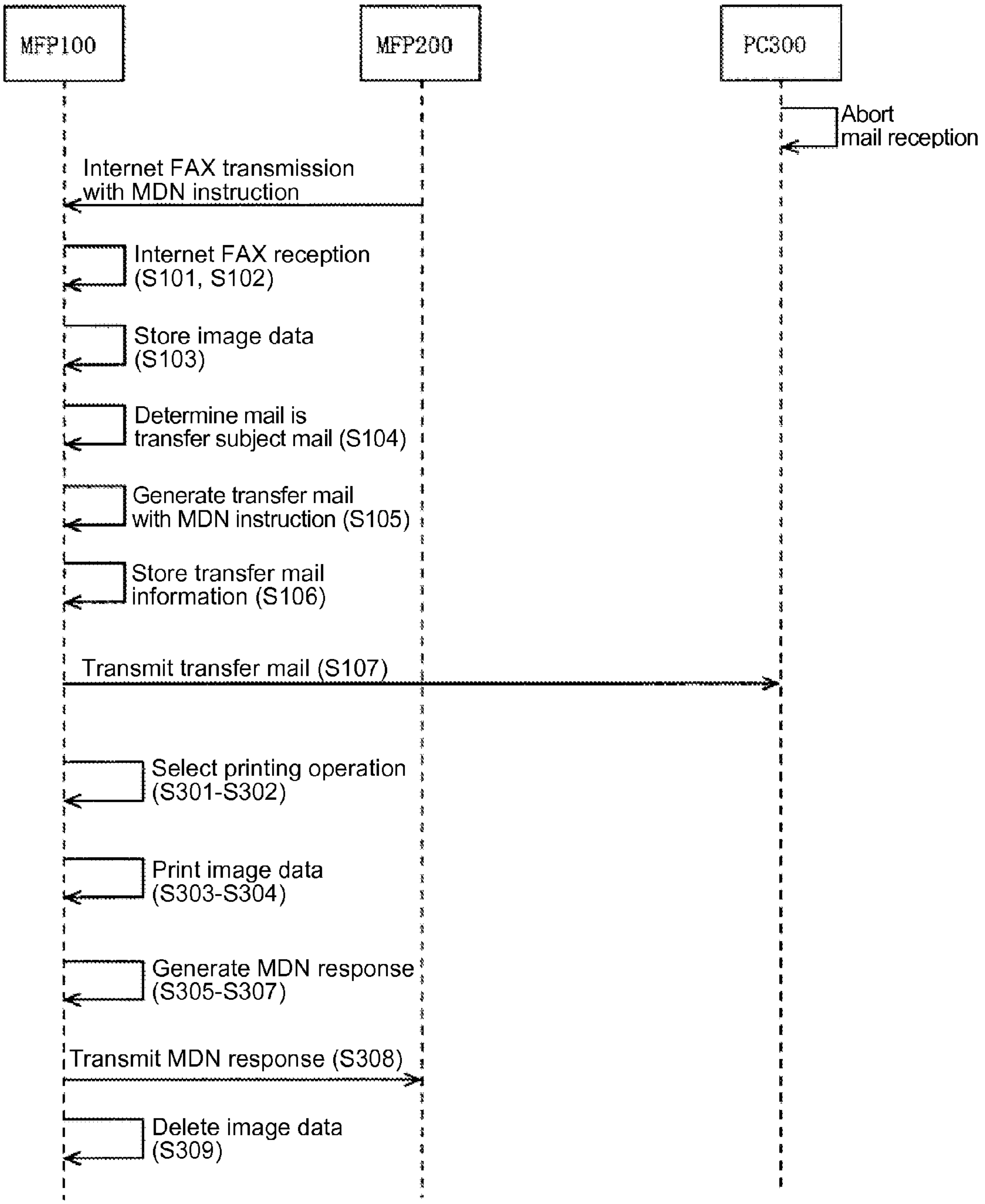
FIG. 13 is a communication chart showing a flow of messages between the devices when the MFP performs the printing operation according to the first embodiment of the present invention.

FIG. 10 is a flow chart showing the printing operation for printing the image data of the TIFF (Tagged Image File Format) file stored in the MFP 100 according to the first embodiment of the present invention. FIG. 11 is a schematic view showing an example of a display screen 900 displayed to the user during the printing operation according to the first embodiment of the present invention. FIG. 13 is a communication chart showing a flow of messages between the devices when the MFP 100 performs the printing operation according to the first embodiment of the present invention.

In the embodiment, the display operation unit 108 of the MFP 100 (refer to FIG. 1) is configured to confirm the image data stored in the MFP 100 and received from the MFP 200 through the data storage unit 107, so that the image data is displayed on the display screen 900 as shown in FIG. 11. More specifically, the display screen 900 is configured to display an image data list **900*a* displaying the image data stored in the MFP 100; a print button 900*c* for instructing the printing operation; and a delete button 900*c* for instructing the deletion operation. The user operates the print button 900*c* or the delete button 900*c*** to select whether the image data is deleted after the printing operation or is deleted as is.

As described above, the MFP 100 receives the mail from the MFP 200 and transfers the mail to the PC 300. In the embodiment, the image data is stored in the MFP 100, and is displayed on the display screen 900 as the image data list **900*a*. It is noted that the image data is attached to the mail, which the MDN response is not transmitted from the PC 300 to the MFP 100. Alternatively, even though the MDN response is transmitted from the PC 300 to the MFP 100, the mail is not properly processed at the PC 300. In other words, the mail corresponds to the one determined to be No in step S203 in the flow chart shown in FIG. 8**. Further, the mail corresponds to the one during the transfer process.

In step S301, the user operates the display operation unit 108 of the MFP 100 to select the operation. In step S302, the control unit 109 determines whether the user selects the printing operation of the image data. In step S303, when the control unit 109 determines that the user selects the printing operation of the image data (Yes in step S302), the data conversion unit 104 converts the image data of the TIFF file to the printable data. In step S304, the printing unit 102 receives the print data thus converted with the data conversion unit 104, and prints the print data.

In step S305, after the printing unit 102 prints the print data, the control unit 109 obtains the information of the mail thus received through the data storage unit 107. More specifically, the control unit 109 obtains the values in the field "Disposition-Notification-To" and the field "Message-ID" of the mail with the MDN instruction attached thereto received from the MFP 200.

In step S306, it is determined whether the MDN instruction is attached to the mail thus received. When it is determined that the MDN instruction is attached to the mail thus received (Yes in step S306), the mail generation unit 105 is notified that the printing operation is properly performed. Further, the values in the field "Disposition-Notification-To" and the field "Message-ID" of the mail are notified to the mail generation unit 105, so that the MDN response is instructed to transmit to the MFP 200.

In step S307, the mail generation unit 105 generates the data of the MDN response in the mail format according to the notification information from the mail analysis unit 106. More specifically, as shown in FIG. 9, the transmission destination is assigned as "mfp200@bbb.com". Further, according to the result of the printing operation, "dispatched" is assigned in the field "disposition-type" as the process result of the MFP 100, indicating that the mail is properly processed.

In step S308, the network communication unit 103 communicates with the server 500 through the network 400 using SMTP, so that the network communication unit 103 transmits the mail of the MDN response generated with the mail generation unit 105 to the mail address of the MFP 200.

After the MFP 100 transmits the mail, the server 500 delivers the mail transmitted from the MFP 100 to the server 600 through several mail servers on the internet 800. Accordingly, the server 600 stores the mail transmitted from the MFP 100 in the mail box corresponding to "mfp200@bbb.com". Afterward, the MFP 200 receives the MDN response from the MFP 100, so that it is possible to confirm that the mail is properly process at the MFP 100.

In step S309, after the network communication unit 103 transmits the mail, the control unit 109 deletes the image data of the TIFF file stored in the MFP 100 and transmitted from the MFP 200, and further deletes the entry of the transfer mail information through the data storage unit 107, thereby completing the process. When it is determined that the MDN instruction is not attached to the mail thus received (No in step S306), the control unit 109 deletes the image data of the TIFF file and the entry of the transfer mail information without generating and transmitting the mail of the MDN response, thereby completing the process.

In the embodiment, when the control unit 109 determines that the user selects the deletion operation without printing the image data (No in step S302, Yes in step S310), the process proceeds to step S305 without performing the printing operation, so that the subsequent process is performed. Further, when the display screen 900 is updated without selecting the printing operation or the deletion operation (No in step S302, No in step S310), the process is completed immediately.

In the description above, the user selects the printing operation of the image data, and the printing operation is properly performed. When the printing operation is not properly performed, or the image data is deleted, the MDN response, in which "processed/error" is specified in the sub-field "disposition-type" shown in FIG. 9, is transmitted to the MFP 200. Other process is similar to that described above.

In the embodiment, the image data is listed on the display screen 900 as the image data list 900*a*, and is collectively processed. Alternatively, a selection button may be arranged on the display screen 900 for selecting desired image data among the image data listed in the image data list 900*a*. With such a configuration, it is possible to individually select and process the image data thus selected.

As described above, in the embodiment, the PC 300 is the personal computer. It is noted that as far as the PC 300 has the functions of the SMTP client and the POP client, it is possible to obtain the similar effect. Further, the MFP 200 does not necessarily have the configuration similar to that of the MFP 100. Further, the MFP 100 is configured to transfer the mail received through the internet Fax reception. Alternatively, the MFP 100 may be configured to transfer a mail received through a process other than the internet Fax reception. Further, in addition to the configuration shown in FIG. 1, a facsimile communication unit capable of receiving and transmitting facsimile data may be provided, so that it is possible to transfer the image data received through a facsimile.

As described above, in the image processing system in the embodiment, even when the mail transmitted from the MFP 100 is not received at the transmission destination, or is not properly processed, the image data received with the MFP 100 is stored without being deleted. Accordingly, for example, after the user returns from the business trip destination, it is possible to confirm the image data received with the MFP 100 through the printing operation and the like.

Second Embodiment

Figure 14:
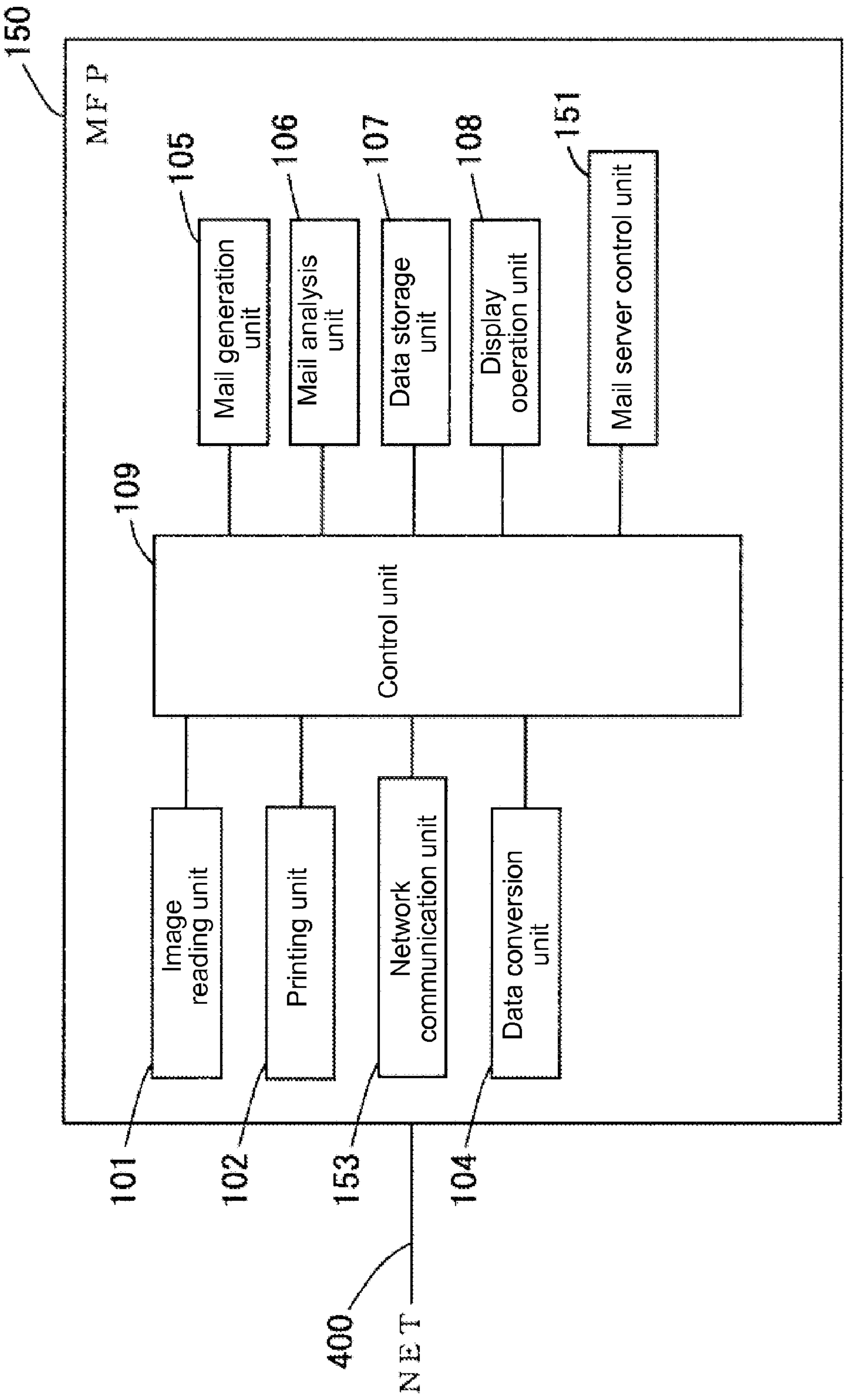
FIG. 14 is a block diagram showing a configuration of an MFP (Multi Function Peripheral) as an image processing apparatus according to a second embodiment of the present invention.

A second embodiment of the present invention will be explained next. FIG. 14 is a block diagram showing a configuration of an MFP (Multi Function Peripheral) 150 as an image processing apparatus according to the second embodiment of the present invention.

As shown in FIG. 14, different from the MFP 100 in the first embodiment shown in FIG. 1, the MFP 150 includes a network communication unit 153 and a mail server control unit 151. Further, the control unit 109 is configured to perform a process different from that in the first embodiment. Components of the MFP 150 in the second embodiment similar to those of the MFP 100 in the first embodiment (refer to FIG. 1) are designated with the same reference numerals, and explanations thereof are omitted.

In the second embodiment, in addition to the function of the network communication unit 103 in the first embodiment (refer to FIG. 1), the network communication unit 153 is capable of performing a process as an IMAP4 (Internet Message Access Protocol 4) client to receive the mail when the mail is transmitted to the MFP 150.

In the second embodiment, the mail server control unit 151 is configured to control the network communication unit 153 through the control unit 109. More specifically, the mail server control unit 151 is configured to control a process of a mail on a mail server such as communicating with the mail server through IMAP to receive the mail without deleting the mail on the mail server, or reaching the mail on the mail server to delete the mail from a search result. It is noted that the network communication unit 153 and the mail server control unit 151 correspond to the communication unit.

As described above, the MFP 150 has the configuration similar to that of the MFP 100 in the first embodiment except that the mail server control unit 151 is additionally disposed therein. Accordingly, when the user operates the display operation unit 108 to input the instruction for performing the internet FAX transmission, the image reading unit 101 reads the original set on the MFP 100 to generate the image data. Then, the data conversion unit 104 converts the image data generated to the file of the TIFF format. After the mail generation unit 105 generates the file converted with the data conversion unit 104 in the mail format, the network communication unit 103 transmits the mail of the data in the mail format. Further, after the network communication unit 153 receives the mail with the file attached thereto from the mail server, the mail analysis unit 106 analyzes the mail. Then, the data conversion unit 104 converts the file thus attached to the print data, so that the printing unit 102 prints the print data.

Figure 15:
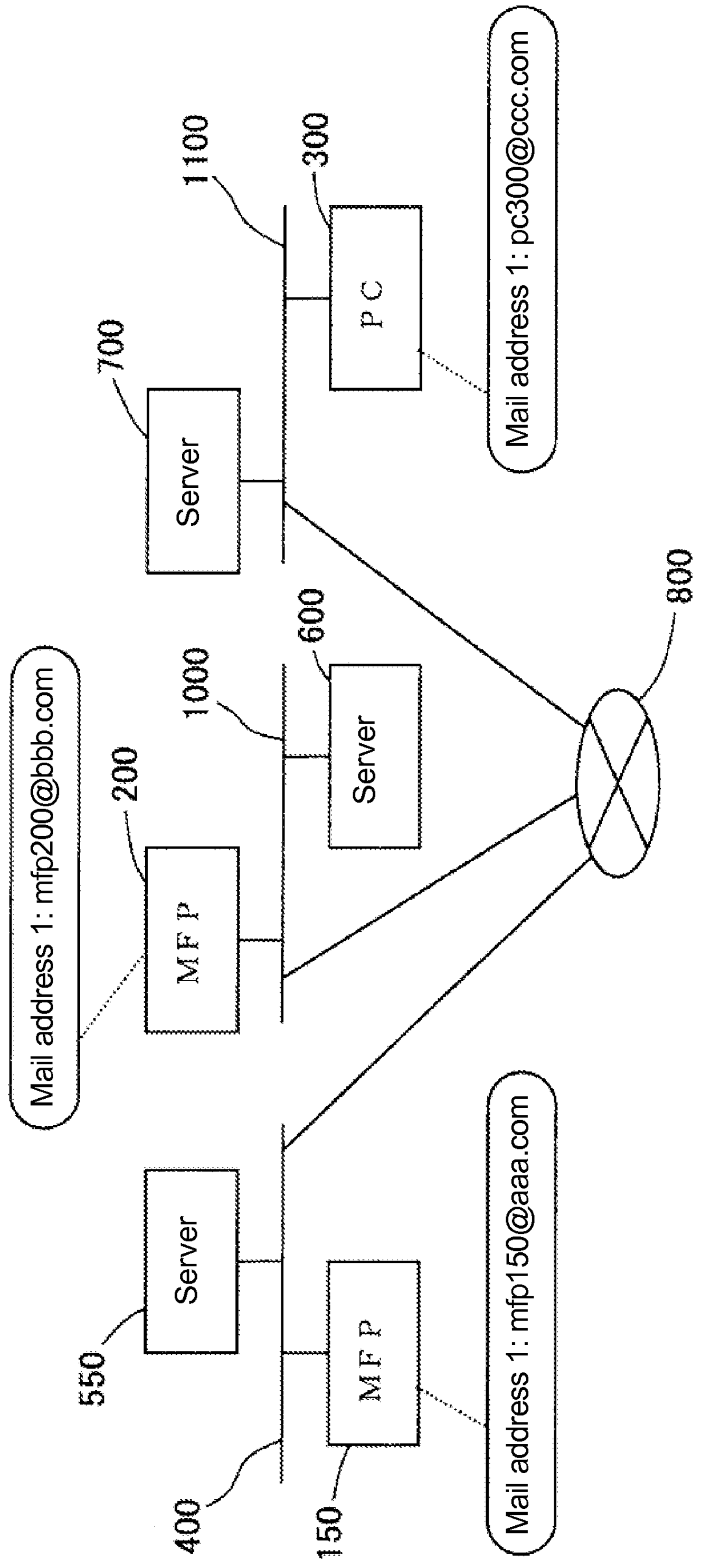
FIG. 15 is a schematic view showing a network including an image processing system according to the second embodiment of the present invention.

FIG. 15 is a schematic view showing a network including an image processing system according to the second embodiment of the present invention. As shown in FIG. 15, in the network, the MFP 150, the MFP 200, the PC (Personal Computer) 300, a server 550, the server 600, and the server 700 are connected to the internet 800 through the network 400, the network 1000, and the network 1100. Accordingly, it is possible to perform the communication through TCP/IP.

In the second embodiment, in addition to the function of the server 500 in the first embodiment, the server 550 is provided with the function of the IMAP server, so that the server 550 is configured to receive an instruction from the IMAP client. Other components are similar to those in the first embodiment.

In the second embodiment, the MFP 150, the MFP 200, the PC 300, the server 550, the server 600, and the server 700 are connected to the internet 800, thereby making it possible to perform communication through TCP/IP. Alternatively, other network configuration may be used. Further, the MFP 200 may have the configuration similar to that of the MFP 150 except the setting information such as the mail address and the like.

An operation of the MFP 150 in the network shown in FIG. 15 will be explained next. In the operation, the MFP 150 receives the mail with the MDN instruction transmitted from the MFP 200 from the server 550 through the internet FAX reception without deleting the mail. Then, the MFP 150 newly attaches the MDN instruction to the mail thus received, and transfers the mail to the PC 300.

More specifically, as an actual example, before the user of the MFP 150 travels to the business trip destination, the user sets the MFP 150 such that the mail received from the MFP 200 through the internet FAX reception is to be transferred to the PC 300 located at the business trip destination. After the user of the MFP 150 travels to the business trip destination, the user receives the mail with the PC 300 at the business trip destination, and the MDN response is transmitted from the PC 300. The following description will explain the flow of the operation described above.

Figure 16:
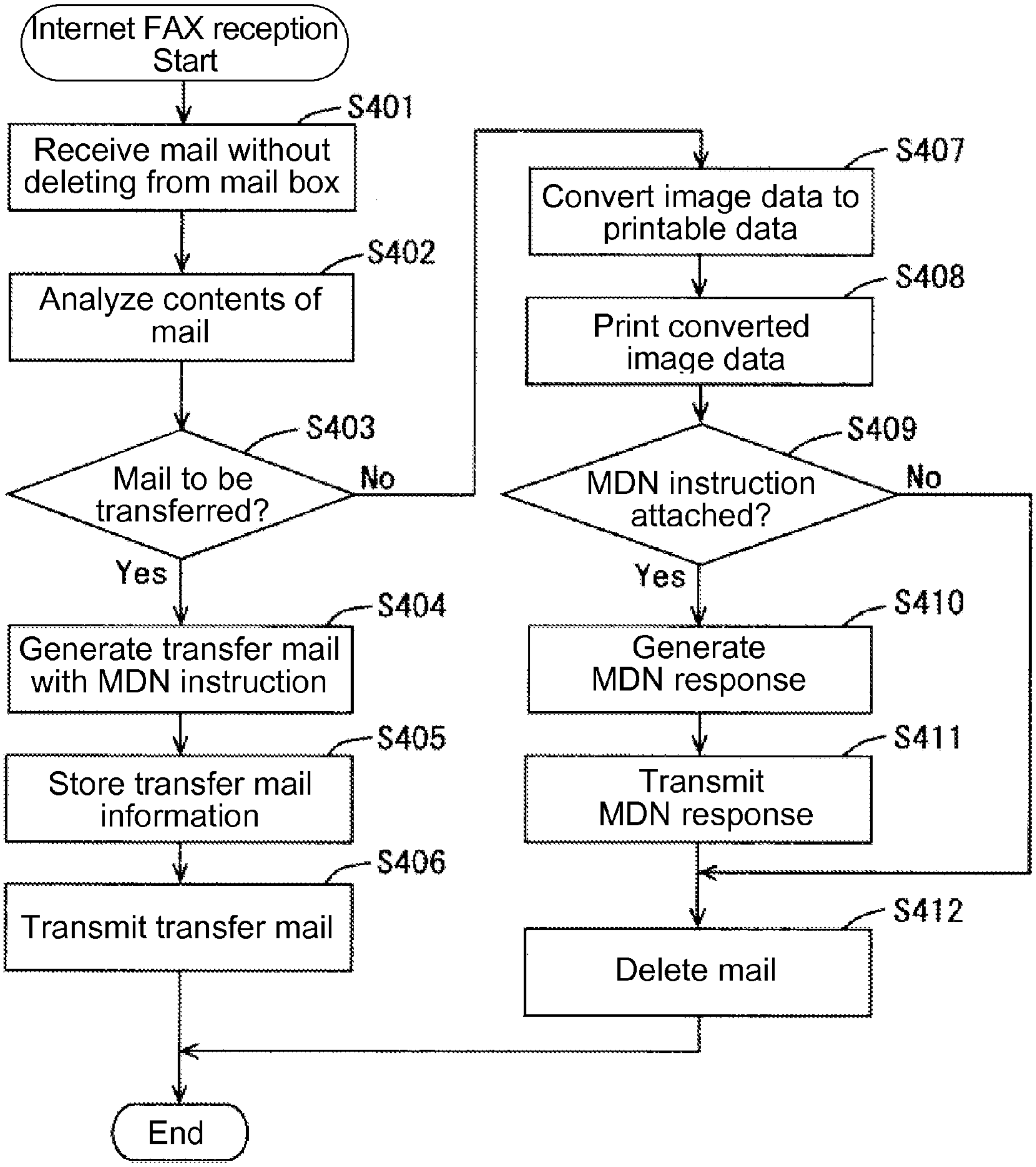
FIG. 16 is a flow chart showing a mail transfer operation of the MFP when the MFP performs an internet FAX reception according to the second embodiment of the present invention.
Figure 20:
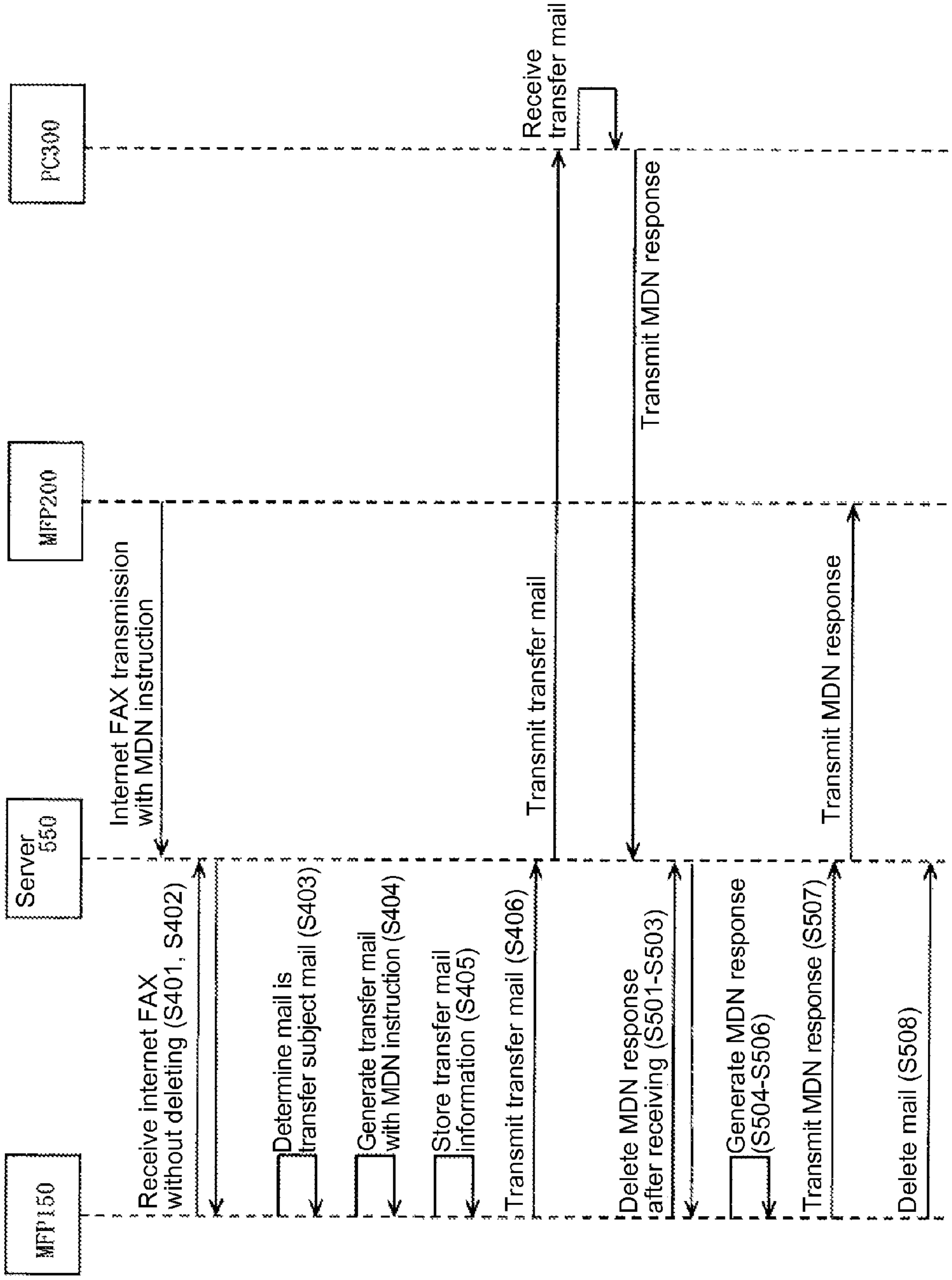
FIG. 20 is a communication chart showing a flow of messages between the devices when the MFP performs the mail transfer operation according to the second embodiment of the present invention.

FIG. 16 is a flow chart showing the mail transfer operation of the MFP 150 when the MFP 150 performs the internet FAX reception according to the second embodiment of the present invention. FIG. 20 is a communication chart showing a flow of messages between the devices when the MFP 150 performs the mail transfer operation according to the second embodiment of the present invention. In the following description, the mail transfer operation of the MFP 150 will be explained with reference to FIGS. 14, 15 and 20 along the flow chart shown in FIG. 16.

In the mail transfer operation of the MFP 150, first, the user operates the display operation unit 108 of the MFP 150 (refer to FIG. 14) to set the MFP 150 such that the mail address "pc300@ccc.com" of the PC 300 located at the business trip destination is to be the transmission destination when the MFP 150 receives the mail having the mail address "mfp200@bbb.com" of the MFP 200 as the transmission origination address through the internet FAX reception. It is noted that the data storage unit 107 stores the setting data.

After the user travels to the business trip destination, when the MFP 200 transmits the mail through the internet FAX transmission with the mail address "mfp150@aaa.com" of the MFP 150 as the transmission destination address, the mail is stored in a mail box of the server 500 corresponding to the mail address "mfp150@aaa.com" through the network 400 via the server 600 and several mail servers on the internet 800.

In step S401, the mail server control unit 151 of the MFP 150 (refer to FIG. 14) controls the network communication unit 153 to communicate with the server 500 (refer to FIG. 15) using IMAP4 through the network 400. Accordingly, the network communication unit 153 of the MFP 150 (refer to FIG. 14) receives the mail stored in the mail box of "mfp150@aaa.com" and transmitted to the MFP 150 from the MFP 200 without deleting the mail from the mail box.

In step S402, after the MFP 150 receives the mail, the mail analysis unit 106 (refer to FIG. 14) receives the mail thus received from the network communication unit 153 and analyzes the contents of the mail. More specifically, the mail analysis unit 106 analyzes whether the TIFF file is attached to the mail; whether the MDN instruction is attached to the mail from the field "Disposition-Notification-To" (refer to FIG. 4); and whether the mail is the transfer subject mail to be transferred to the transfer destination "mfp200@bbb.com" from the field "From" (refer to FIG. 4). It is noted that the field "Disposition-Notification-To" and the field "From" relative to the MDN instruction are similar to those in the first embodiment.

FIG. 4 is the schematic view showing the mail format representing the transmission contents of the mail transmitted from the MFP 200 through the internet FAX transmission. It is noted that, in the second embodiment, the mail address "mfp100@aaa.com" is replaced with the mail address "mfp150@aaa.com".

In step S403, the control unit 109 (refer to FIG. 15) determines whether the mail thus received is the transfer subject mail to be transferred to the transfer destination. When the control unit 109 determines that the mail thus received is the transfer subject mail from the analysis result of the mail analysis unit 106 (Yes in step S403), the control unit 109 obtains the mail address "pc300@ccc.com" of the PC 300 from the data storage unit 107 (refer to FIG. 15), and specifies the mail address as the transmission destination. Then, the control unit 109 requests the mail generation unit 105 to transfer the TIFF file thus received through the transfer mail transmission.

In step S404, according to the specified information, the mail generation unit 105 generates the transfer mail with the TIFF file attached thereto having the transmission destination "pc300@ccc.com" as shown in FIG. 5. Afterward, the mail generation unit 105 transmits the data thus generated to the network communication unit 153. It is noted that, in the second embodiment, the mail address "mfp100@aaa.com" in FIG. 5 is replaced with the mail address "mfp150@aaa.com".

FIG. 5 is the schematic view showing the mail format representing the transmission contents of the transfer mail generated with the MFP 150. It is noted that, in the second embodiment, the mail address "mfp100@aaa.com" in FIG. 5 is replaced with the mail address "mfp150@aaa.com".

As shown in FIG. 5, the transmission origination of the transfer mail "mfp150@aaa.com" is assigned in the field "From", and the transmission destination of the transfer mail "pc300@aaa.com" is assigned in the field "To". Further, since the MDN instruction is attached to the transfer mail, the transmission destination of the MDN response "mfp150@aaa.com" is assigned in the field "Disposition-Notification-To".

In step S405, the transfer mail information is stored in the data storage unit 107. In the transfer mail information, the mail thus received with the MDN instruction attached thereto, and various information of the transfer mail are correlated as shown in FIGS. 17(*a*) to 17(*c*). FIGS. 17(*a*) to 17(*c*) are schematic views showing the transfer mail information according to the second embodiment of the present invention. When the MDN response of the transfer mail is returned, the transfer mail information shown in FIGS. 17(*a*) to 17(*c*) is used (described later).

In step S406, the network communication unit 153 communicates with the server 550 as the mail server using SMTP through the network 400, so that the network communication unit 153 transmits the transfer mail to the mail address of the PC 300.

When the control unit 109 determines that the mail thus received is not the transfer subject mail from the analysis result of the mail analysis unit 106 (No in step S403), the process proceeds to step S407, so that the data conversion unit 104 converts the image data thus received to the printable data. The process from step S407 to step S412 is similar to that in the first embodiment from step S108 to step S113, and an explanation thereof is omitted.

In the embodiment, after the MFP 150 transmits the transfer mail, the server 500 (refer to FIG. 15) transfers the transfer mail transmitted from the MFP 150 to the server 700 through several mail servers on the internet 800. Then, the server 700 stores the transfer mail transmitted from the MFP 150 in the mail box corresponding to "pc300@ccc.com".

Afterward, the PC 300 (refer to FIG. 15) receives the transfer mail transmitted from the MFP 150 from the server 700. At this moment, the MDN instruction is attached to the transfer mail. Accordingly, the PC 300 transmits the MDN response to the MFP 150. The mail server processes the MDN response transmitted from the PC 300 to the MFP 150, and eventually the server 500 stores the MDN response to the mail box corresponding to "mfp150@aaa.com".

FIG. 7 is the schematic view showing the mail format of the MDN (Message Disposition Notification) response transmitted from the PC (Personal Computer) 300 to the MFP 150. It is noted that, in the second embodiment, the mail address "mfp100@aaa.com" in FIG. 7 is replaced with the mail address "mfp150@aaa.com".

As shown in FIG. 7, when "dispatched" is specified in the sub-field "disposition-type", it is indicated that the PC 300 opens and properly processes the transfer mail. When "processed/error" is specified in the sub-field "disposition-type", it is indicated that the PC 300 does not properly process the transfer mail, i.e., the PC 300 does not open and deletes the transfer mail.

Figure 18:
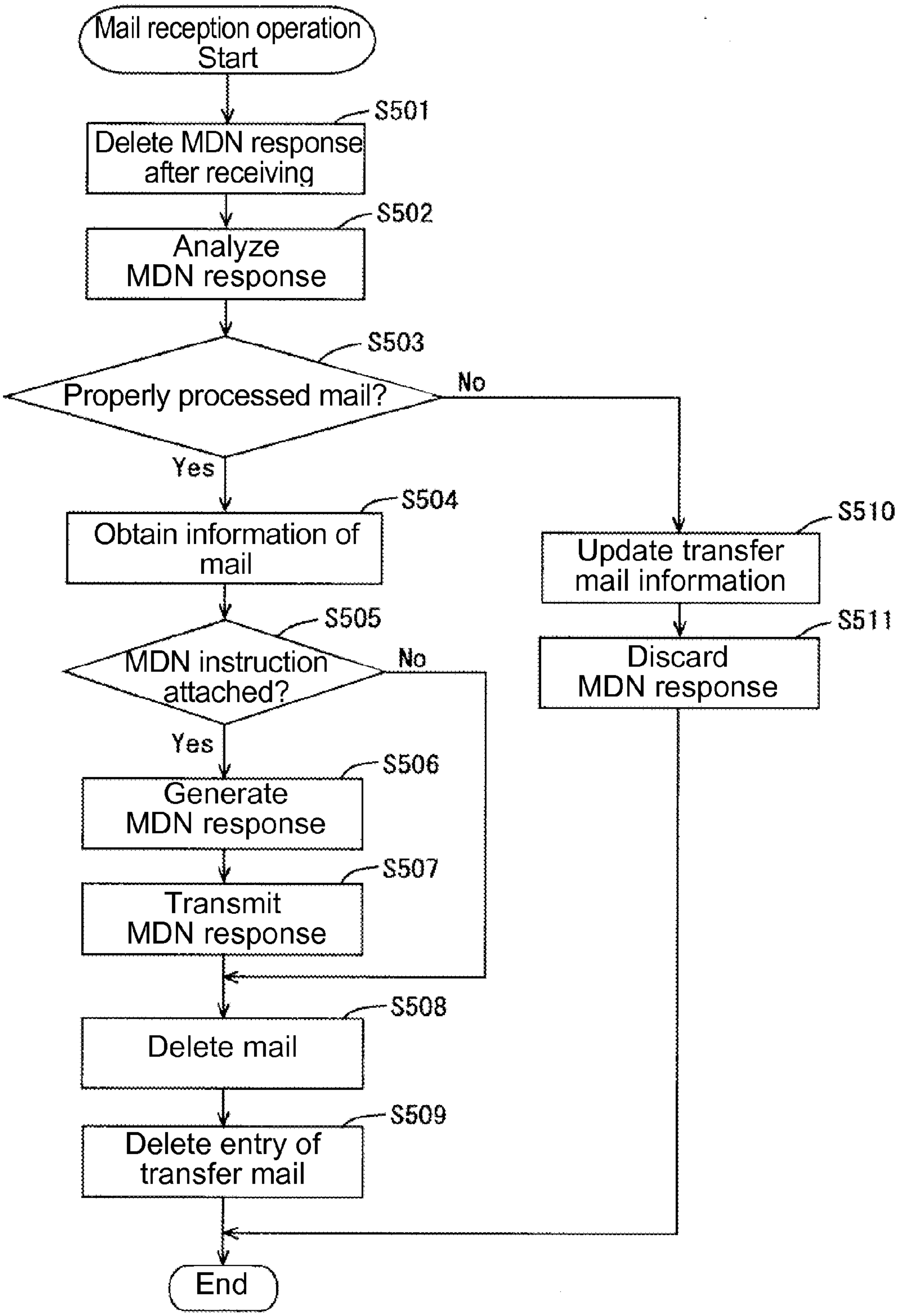
FIG. 18 is a flow chart showing a mail reception operation of the MFP when the MFP receives the MDN response transmitted with the PC from a server according to the second embodiment of the present invention.

A mail reception operation of the MFP 150 will be explained next with reference to FIGS. 14 and 15 along a flow chart shown in FIG. 18. FIG. 18 is a flow chart showing the mail reception operation of the MFP 150 when the MFP 150 receives the MDN response transmitted with the PC 300 from the server 550 according to the second embodiment of the present invention.

In step S501, under the control of the mail server control unit 151 (refer to FIG. 14), the network communication unit 153 of the MFP 150 communicates with the server 550 through the network 400 using IMAP4, so that the network communication unit 153 of the MFP 150 receives the MDN response transmitted from the PC 300 to the MFP 150 and stored in the mail box "mfp150@aaa.com". Afterward, the network communication unit 153 of the MFP 150 deletes the MDN response from the mail box.

In step S502, the mail analysis unit 106 receives the mail thus received from the network communication unit 153, and performs the mail analysis through the data storage unit 107 referring to the transfer mail information represented in FIG. 17(*a*). As a result, the mail analysis unit 106 determines that the mail thus received is the MDN response of the mail transferred to the PC 300 judging from the field "Original-Message-ID" shown in FIG. 7. It is noted that the field "Original-Message-ID" relative to the MDN response is similar to that in the first embodiment.

In step S503, the mail analysis unit 106 determines whether the PC 300 properly processes the mail referring to the sub-field "disposition-type" (refer to FIG. 7) indicating the process result and attached to the MDN response. When "dispatched" is specified in the sub-field "disposition-type", the mail analysis unit 106 determines that the PC 300 properly processes the mail (Yes in step S503).

In step S504, when the mail analysis unit 106 determines that the PC 300 properly processes the mail (Yes in step S503), the mail analysis unit 106 obtains the information of the mail thus received from the transfer mail information shown in FIG. 17. More specifically, the mail analysis unit 106 obtains the value "mfp200@bbb.com" in the field "Disposition-Notification-To" and the value "20A79708.000000A800000001.13333331@bbb.com" in the field "Message-ID" of the mail with the MDN instruction attached thereto and received from the MFP 200.

In step S505, the mail analysis unit 106 determines whether the MDN instruction is attached to the mail received from the MFP 200. When the mail analysis unit 106 determines that the MDN instruction is attached to the mail (Yes in step S505), the mail analysis unit 106 notifies the mail generation unit 105 that the PC 300 properly processes the mail, the value in the field "Disposition-Notification-To", and the value in the field "Message-ID", so that the transmission request of the MDN response to the MFP 200 is transmitted to the mail generation unit 105.

In step S506, when the mail generation unit 105 receives the transmission request, the mail generation unit 105 generates the MDN response with respect to the mail thus received. More specifically, based on the notification information from the mail analysis unit 106, the mail generation unit 105 generates the data of the mail format of the MDN response as shown in FIG. 9, in which the transmission designation is set to "mfp200@bbb.com", and "dispatched" is specified in the sub-filed "disposition-type" indicating that the mail is properly processed as the process result of the MFP 150 from the process result of the mail thus transferred. It is noted that, in the second embodiment, the mail address "mfp100@aaa.com" in FIG. 9 is replaced with the mail address "mfp150@aaa.com".

In step S507, the network communication unit 153 communicates with the server 550 through the network 400 using SMTP, so that the network communication unit 153 transmits the mail of the MDN response generated with the mail generation unit 105 to the mail address of the MFP 200.

In the embodiment, after the MFP 150 transmits the mail to the MFP 200, the server 550 transmits the mail transmitted from the MFP 150 to the server 600 through several mail servers on the internet 800. Then, the server 600 stores the mail thus received and transmitted from the MFP 150 in the mail box corresponding to "mfp200@bbb.com". Afterward, the MFP 200 receives the MDN response from the MFP 150, so that it is possible to confirm that the MFP 150 properly processes the mail.

In step S508, after the network communication unit 153 transmits the mail, the mail server control unit 151 of the MFP 150 communicates with the server 550 using IMAP4 to search the mail received from the MFP 200 through the internet FAX reception and stored in the mail box corresponding to "mfp150@aaa.com", so that the mail server control unit 151 of the MFP 150 deletes the mail. In step S509, the mail server control unit 151 of the MFP 150 deletes the entry of the transfer mail information through the data storage unit 107.

When the mail analysis unit 106 determines that the MDN instruction is not attached to the mail (No in step S505), step S508 and step S509 are performed to delete the mail and the entry without generating and transmitting the mail of the MDN response, thereby completing the process.

When the error such as "processed/error", not "dispatched", is specified in the sub-field "disposition-type" shown in FIG. 7, the mail analysis unit 106 determines that the PC 300 does not properly process the mail (No in step S503). In this case, in step S510, the mail analysis unit 106 updates the transfer mail information thus stored. In step S511, the mail analysis unit 106 discards the MDN response thus received, thereby completing the process.

In the embodiment, when the MFP 150 receives the mail with the MDN instruction attached thereto from the MFP 200, the MFP 150 transmits the mail of the MDN response as the response to the MFP 200. Alternatively, for example, after the transfer mail to the PC 300 is transmitted to the server 500, a progress status may be transmitted to the MFP 200 through a normal response mail indicating the transfer, and a final result may be transmitted as the MDN response.

As described above, in the embodiment, the MFP 150 transfers the transfer mail to the PC 300, and the PC 300 transmits the MDN response to the MFP 150. Next, an operation in a case that the PC 300 does not transmit the MDN response will be explained. In such a case that, for example, the user returns from the business trip destination, after the user deletes the mail box of the server 700 corresponding to "pc300@ccc.com" at the business trip destination, the MFP 150 receives the mail from the MFP 200 and transfers the mail to the PC 300 while the user is returning from the business trip destination.

As describe above, while the user is returning from the business trip destination, the user specifies the mail address of the MFP 150 "mfp150@aaa.com" as the transmission destination, and transmits the mail from the MFP 200 through the internet FAX transmission. Accordingly, the mail is transmitted through the network 400 via the server 600 and several mail servers on the internet 800, and is stored in the mail box of the server 550 corresponding to "mfp150@aaa.com".

It is noted that the operation of the MFP 150 for receiving the mail from the MFP 200 and transmitting the transfer mail to the PC 300 is similar to the transfer operation explained with reference to the flow chart shown in FIG. 16, and an explanation thereof is omitted. Only an operation of the MFP 150 after the MFP 150 transmits the transfer mail to the server 550 with the PC 300 as the transmission destination will be explained.

After the MFP 150 transmits the transfer mail to the server 550, the server 550 transfers the transfer mail to the server 700 through several mail servers on the internet 800. In this case, the mail box of the server 700 corresponding to "pc300@ccc.com" is already deleted. Accordingly, the transfer mail from the MFP 150 fails to be transferred to the server 700, and the mail server discards the transfer mail transmitted from the MFP 150. Accordingly, the PC 300 does not transmit the MDN response to the MFP 150.

As described above, when the mail box of the server 700 corresponding to "pc300@ccc.com" is deleted, the PC 300 does not transmit the MDN response to the MFP 150. Further, it is noted that even though the mail box of the server 700 corresponding to "pc300@ccc.com" is not deleted, and the transfer mail transmitted to the PC 300 is properly stored, when the user deletes the reception setting set in the PC 300 for receiving the mail from the mail box "pc300@ccc.com", or the user cannot manually receive the mail in the PC 300 since the user is returning from the business trip destination, the PC 300 does not transmit the MDN response to the MFP 150.

Figure 21:
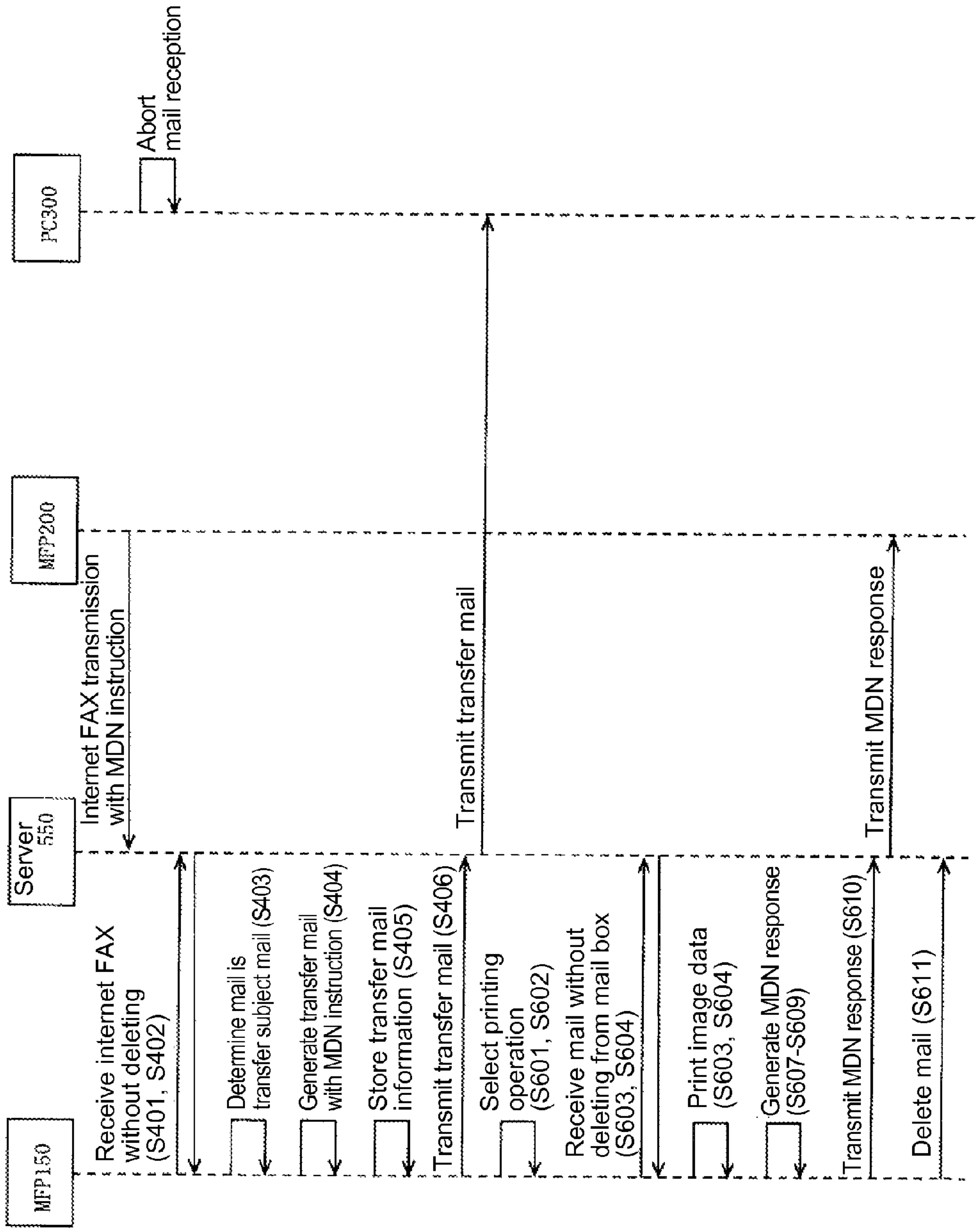
FIG. 21 is a communication chart showing a flow of messages between the devices when the MFP performs the printing operation according to the second embodiment of the present invention.

A printing operation of the MFP 150 will be explained next with reference to FIGS. 14, 15 and 21 along a flow chart shown in FIG. 19. In the printing operation, after returning from the business trip destination, the user operates the MFP 150 to receive the mail stored in the server 550 without being deleted and received from the MFP 200 through the internet FAX reception, and print the image data thus received.

Figure 19:
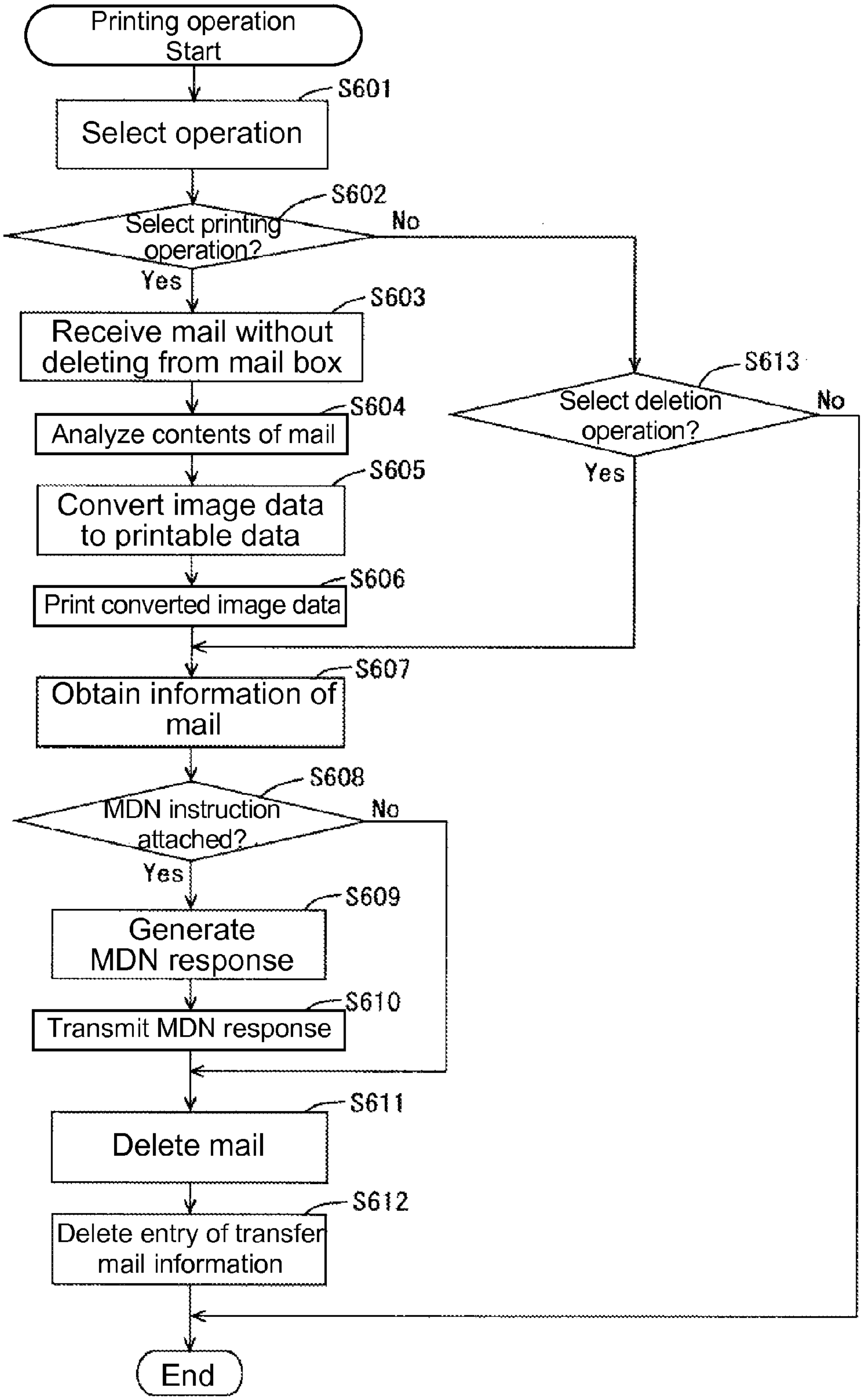
FIG. 19 is a flow chart showing a printing operation for printing image data stored in the server according to the second embodiment of the present invention.

FIG. 19 is a flow chart showing the printing operation for printing the image data stored in the server 550 according to the second embodiment of the present invention. FIG. 21 is a communication chart showing a flow of messages between the devices when the MFP 150 performs the printing operation according to the second embodiment of the present invention.

In the embodiment, the display operation unit 108 of the MFP 150 (refer to FIG. 14) is configured to confirm the image data stored in the server 550 and received from the MFP 200 through the data storage unit 107, so that the image data is displayed on the display screen 900 as shown in FIG. 11. At this moment, the display screen 900 is configured to display the image data list **900*a* displaying the image data stored in the server 550; the print button 900*c* for instructing the printing operation; and the delete button 900*c* for instructing the deletion operation. The user operates the print button 900*c* or the delete button 900*c*** to select whether the image data is deleted after the printing operation or is deleted as is.

As described above, the MFP 150 receives the mail from the MFP 200 and transfers the mail to the PC 300. In the embodiment, the image data is stored in the server 550, and is displayed on the display screen 900 as the image data list **900*a*. It is noted that the image data is attached to the mail, which the MDN response is not transmitted from the PC 300 to the MFP 150. Alternatively, even through the MDN response is transmitted from the PC 300 to the MFP 150, the mail is not properly processed at the PC 300. In other words, the mail corresponds to the one determined to be no in step S503 in the flow chart shown in FIG. 18**. Further, the mail corresponds to the one during the transfer process.

In step S601, the user operates the display operation unit 108 of the MFP 150 to select the operation. In step S602, the control unit 109 determines whether the user selects the printing operation of the image data. In step S603, when the control unit 109 determines that the user selects the printing operation of the image data (Yes in step S602), the mail server control unit 151 of the MFP 150 communicates with the server 550 using IMAP4 through the network communication unit 153 to search the mail received from the MFP 200 through the internet FAX reception and stored in the mail box corresponding to "mfp150@aaa.com", so that the mail server control unit 151 of the MFP 150 receives the mail from the mail box without deleting the mail.

In step S604, the mail analysis unit 106 receives the mail thus received from the network communication unit 153. Further, the mail analysis unit 106 analyzes the mail and obtains the TIFF file attached to the mail. In step S605, the data conversion unit 104 converts the image data of the TIFF file received from the mail analysis unit 106 to the printable data. In step S606, the printing unit 102 receives the print data thus converted with the data conversion unit 104, and prints the print data.

In step S607, after the printing unit 102 prints the print data, the control unit 109 obtains the information of the mail thus received through the data storage unit 107. More specifically, the control unit 109 obtains the values in the field "Disposition-Notification-To" and the field "Message-ID" of the mail with the MDN instruction attached thereto received from the MFP 200.

In step S608, it is determined whether the MDN instruction is attached to the mail thus received. When it is determined that the MDN instruction is attached to the mail thus received (Yes in step S608), the mail generation unit 105 is notified that the printing operation is properly performed. Further, the values in the field "Disposition-Notification-To" and the field "Message-ID" of the mail are notified to the mail generation unit 105, so that the MDN response is instructed to transmit to the MFP 200.

In step S609, the mail generation unit 105 generates the data of the MDN response in the mail format according to the notification information from the mail analysis unit 106. More specifically, as shown in FIG. 9, the transmission destination is assigned as "mfp200@bbb.com". Further, according to the result of the printing operation, "dispatched" is assigned in the field "disposition-type" as the process result of the MFP 150, indicating that the mail is properly processed. It is noted that, in the second embodiment, the mail address "mfp100@aaa.com" in FIG. 9 is replaced with the mail address "mfp150@aaa.com".

In step S610, the network communication unit 153 communicates with the server 550 through the network 400 using SMTP, so that the network communication unit 153 transmits the mail of the MDN response generated with the mail generation unit 105 to the mail address of the MFP 200.

After the MFP 150 transmits the mail, the server 550 delivers the mail transmitted from the MFP 150 to the server 600 through several mail servers on the internet 800. Accordingly, the server 600 stores the mail transmitted from the MFP 150 in the mail box corresponding to "mfp200@bbb.com". Afterward, the MFP 200 receives the MDN response from the MFP 150, so that it is possible to confirm that the mail is properly process at the MFP 150.

In step S611, after the network communication unit 153 transmits the mail, the mail server control unit 151 of the MFP 150 communicates with the server 550 using IMAP4 through the network communication unit 153 to search the mail received from the MFP 200 through the internet FAX reception and stored in the mail box corresponding to "mfp150@aaa.com", so that the mail server control unit 151 of the MFP 150 deletes the mail from the mail box. In step S612, the mail server control unit 151 deletes the entry of the transfer mail information through the data storage unit 107, thereby completing the process.

When it is determined that the MDN instruction is not attached to the mail thus received (No in step S608), the mail server control unit 151 deletes the mail and the entry of the transfer mail information in step S611 and step S612 without generating and transmitting the mail of the MDN response, thereby completing the process.

In the embodiment, when the control unit 109 determines that the user selects the deletion operation without printing the image data (No in step S602, Yes in step S613), the process proceeds to step S607 without performing the printing operation, so that the subsequent process is performed. Further, when the display screen 900 is updated without selecting the printing operation or the deletion operation (No in step S602, No in step S613), the process is completed immediately.

In the description above, the user selects the printing operation of the image data, and the printing operation is properly performed. When the printing operation is not properly performed, or the image data is deleted, the MDN response, in which "processed/error" is specified in the sub-field "disposition-type" shown in FIG. 9, is transmitted to the MFP 200. Other process is similar to that described above.

In the embodiment, the image data is listed on the display screen 900 as the image data list 900*a*, and is collectively processed. Alternatively, a selection button may be arranged on the display screen 900 for selecting desired image data among the image data listed in the image data list 900*a*. With such a configuration, it is possible to individually select and process the image data thus selected.

As described above, in the embodiment, the PC 300 is the personal computer. It is noted that as far as the PC 300 has the functions of the SMTP client and the POP client, it is possible to obtain the similar effect. Further, the MFP 150 is configured to transfer the mail received through the internet Fax reception. Alternatively, the MFP 150 may be configured to transfer a mail received through a process other than the internet Fax reception.

As described above, in the image processing system in the embodiment, even when the mail transmitted from the MFP 150 is not received at the transmission destination, or is not properly processed, the image data received with the MFP 150 is stored without being deleted. Accordingly, for example, after the user returns from the business trip destination, it is possible to confirm the image data received with the MFP 150 through the printing operation and the like. Further, the transfer data is not stored in the MFP 150. Accordingly, it is possible to prevent the storage capacity from running out even when the storage capacity of the MFP 150 is limited.

In the first and second embodiments, the MFP is explained as the image processing apparatus. The present invention is not limited to the MFP, and is applicable to an image processing apparatus having the communication function such as a scanner device, a facsimile, a copier, and the like.

The disclosure of Japanese Patent Application No. 2011-058749, filed on Mar. 17, 2011, is incorporated in the application by reference.

While the invention has been explained with reference to the specific embodiments of the invention, the explanation is illustrative and the invention is limited only by the appended claims.

What is claimed is:

1. An image processing apparatus for processing an image, comprising:

a communication unit capable of communicating with a plurality of external devices including a first external device and a second external device through a network;

a data storage unit for storing a first mail transmitted from the first external device;

a print unit for printing image data of the first mail stored in the data storage unit;

a mail generation unit for generating a second mail including the image data of the first mail and an open mail notification instruction relative to the second external device, and for controlling the communication unit to transfer the second mail to the second external device;

a mail analysis unit capable of analyzing an open mail notification response from the second external device; and a processing control unit for deleting the first mail when the mail analysis unit determines that the second external device receives and opens the second mail, and for notifying a user to open the first mail when the mail analysis unit determines that the second external device does not open the second mail.

2. The image processing apparatus according to claim 1, wherein said mail, generation unit is configured to generate an open mail notification response to be transmitted to the first external device upon deleting the first mail when the first mail includes the open mail notification instruction so that the communication unit transmits the open mail notification response to the first external device.

3. The image processing apparatus according to claim 2, wherein said processing control unit is configured to delete the first mail when the print unit prints the image data of the first mail stored in the data storage unit.

4. The image processing apparatus according to claim 3, further comprising an operation unit having a display unit for displaying information of the first mail and a print selection unit for instructing the print unit to print the image data of the first mail.

5. An image processing system, comprising:

an image processing apparatus for processing an image; and a mail server device capable of communicating with a plurality of external devices including a first external device and a second external device through a network, and capable of storing a first mail transmitted from the first external device, wherein said image processing apparatus comprises:

a communication unit capable of communicating with the mail server device through the network;

a print unit for printing image data of the first mail received with the communication unit;

a mail generation unit for generating a second mail including the image data of the first mail and an open mail notification instruction relative to the second external device, and for controlling the communication unit to transfer the second mail to the second external device;

a mail analysis unit capable of analyzing an open mail notification response from the second external device; and a processing control unit for deleting the first mail when the mail analysis unit determines that the second external device receives and opens the second mail, and for notifying a user to open the first mail when the mail analysis unit determines that the second external device does not open the second mail.

6. The image processing system according to claim 5, wherein said mail, generation unit is configured to generate an open mail notification response to be transmitted to the first external device upon deleting the first mail when the first mail includes the open mail notification instruction so that the communication unit transmits the open mail notification response to the first external device.

7. The image processing system according to claim 6, wherein said processing control unit is configured to delete the first mail when the print unit prints the image data of the first mail stored in the data storage unit.

8. The image processing system according to claim 7, further comprising an operation unit having a display unit for displaying information of the first mail and a print selection unit for instructing the print unit to print the image data of the first mail.

9. An image processing apparatus for processing an image, comprising:

a print unit configured to print the image on a medium;

a communication unit capable of communicating with an external device through a network;

a data storage unit configured to store a first mail;

a mail generation unit configured to generate a second mail including the first mail and an open mail notification instruction to the external device, and for controlling the communication unit to transmit the second mail to the external device;

an obtaining unit configured to obtain an open mail notification response from the external device in response to the open mail notification instruction, said open mail notification response being information indicating that the second mail is opened; and a processing control unit configured to delete the first mail when the obtaining unit obtains the open mail notification response.

10. The image processing apparatus according to claim 9, wherein said processing control unit is configured to notify a user to open the first mail when the obtaining unit does not obtain the open mail notification response.

11. The image processing apparatus according to claim 9, wherein said processing control unit is configured to delete the first mail when the print unit prints the image data of the first mail stored in the data storage unit.

12. The image processing apparatus according to claim 9, further comprising an operation unit having a display unit for displaying information of the first mail and a print selection unit for instructing the print unit to print the image data of the first mail.

* * * * *